Feb. 2, 1937.  D. SAMIRAN  2,069,279
LIQUID MEASURING APPARATUS
Filed April 16, 1935   9 Sheets-Sheet 1
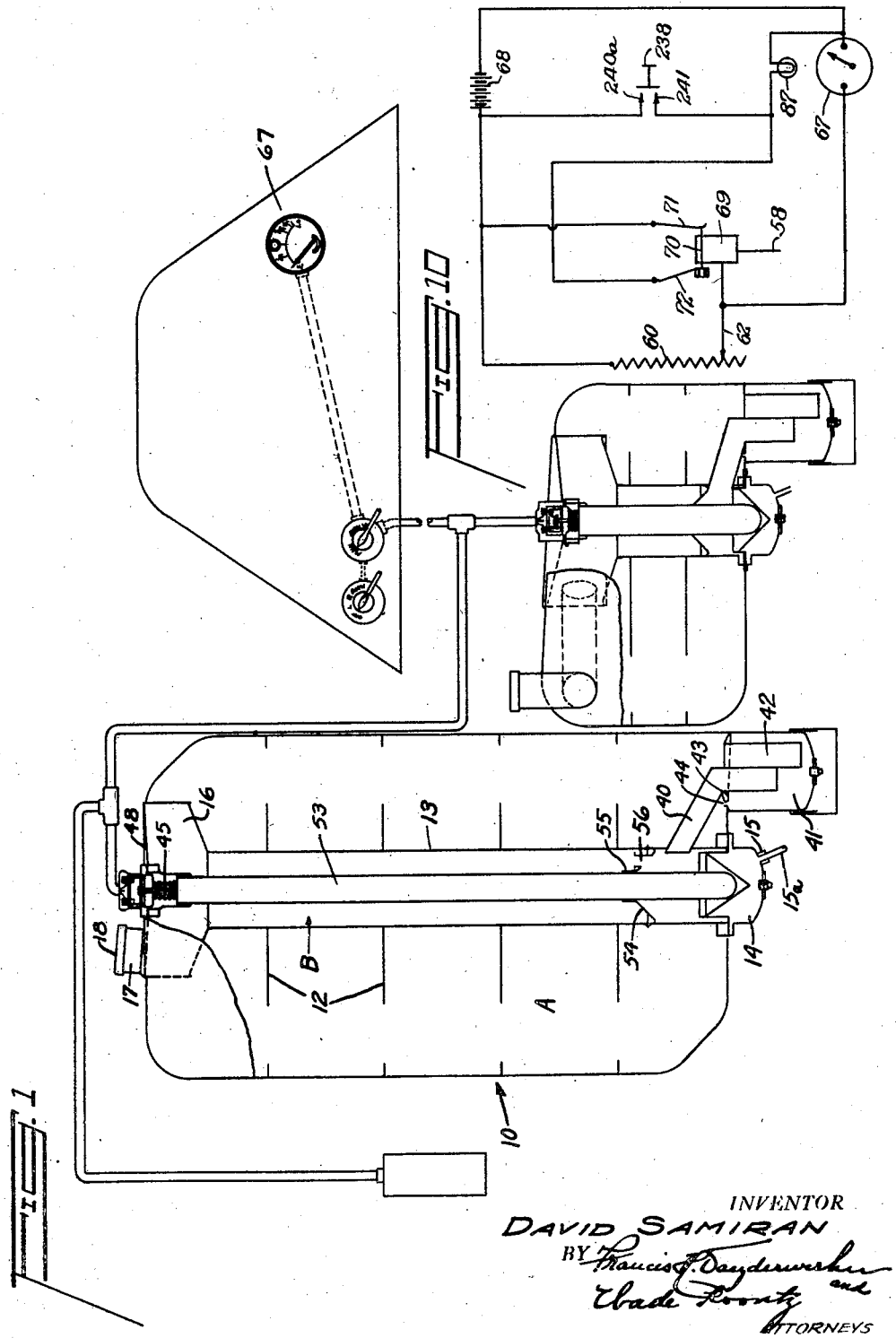
INVENTOR
DAVID SAMIRAN
BY
ATTORNEYS

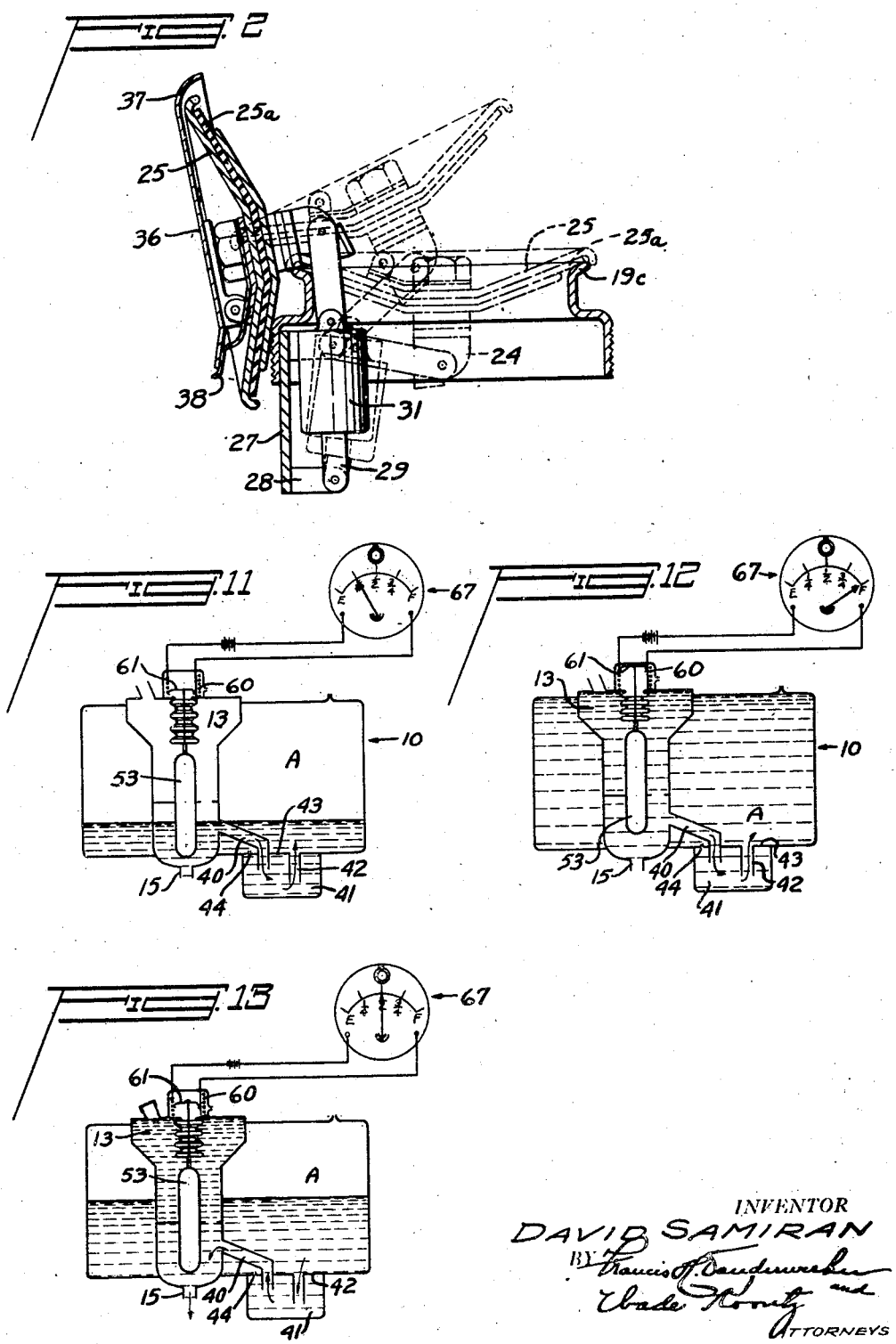

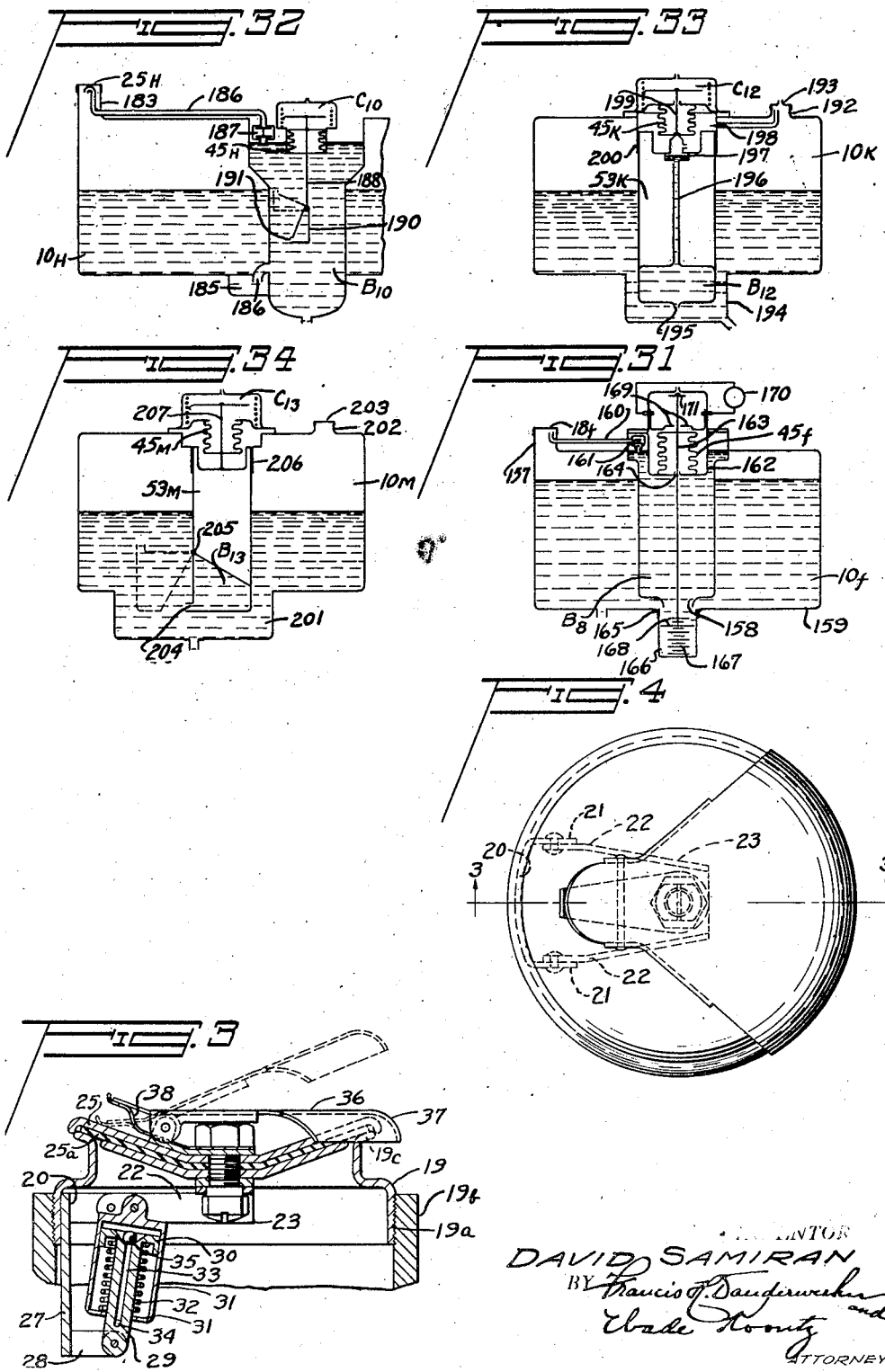

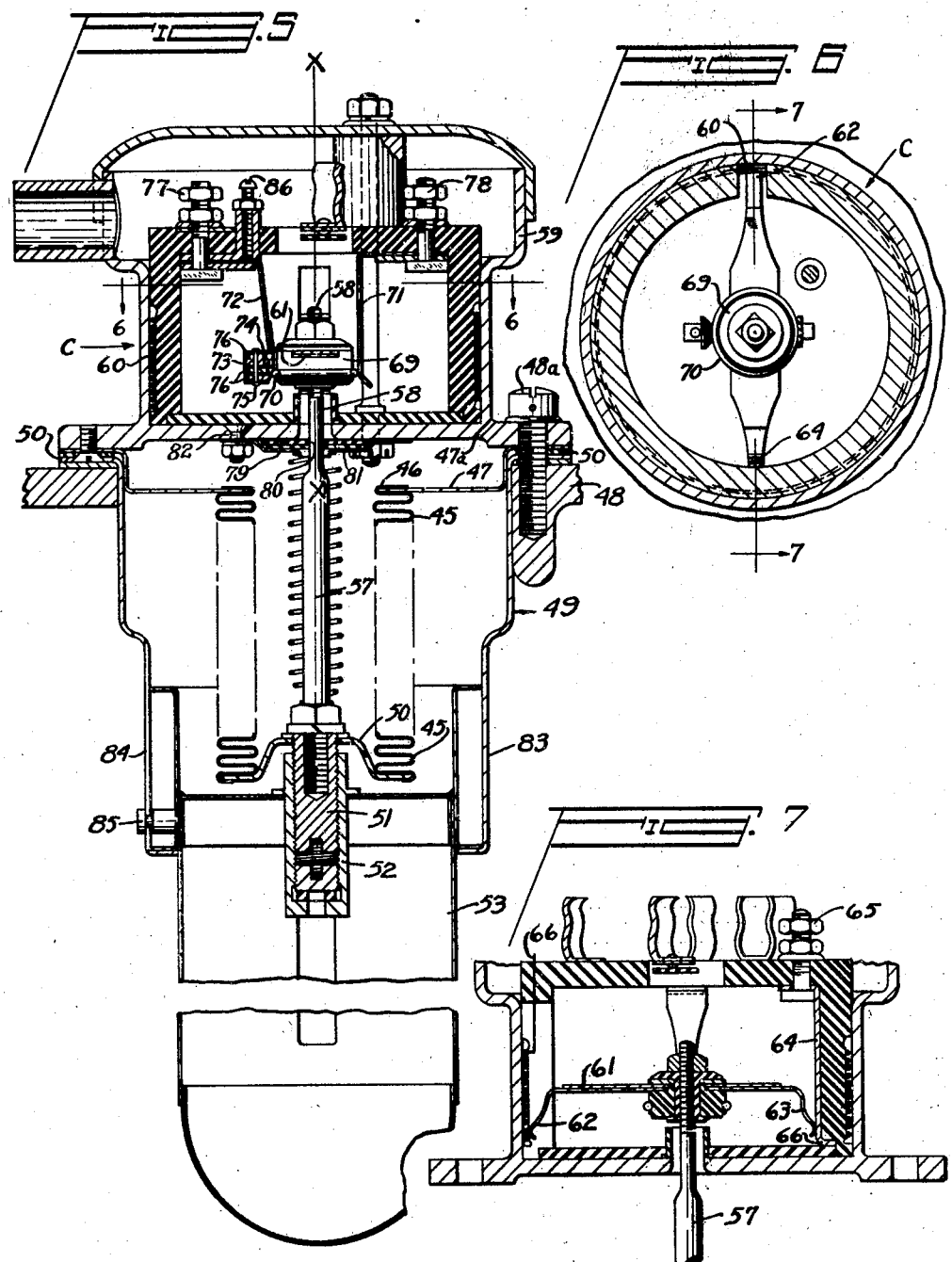

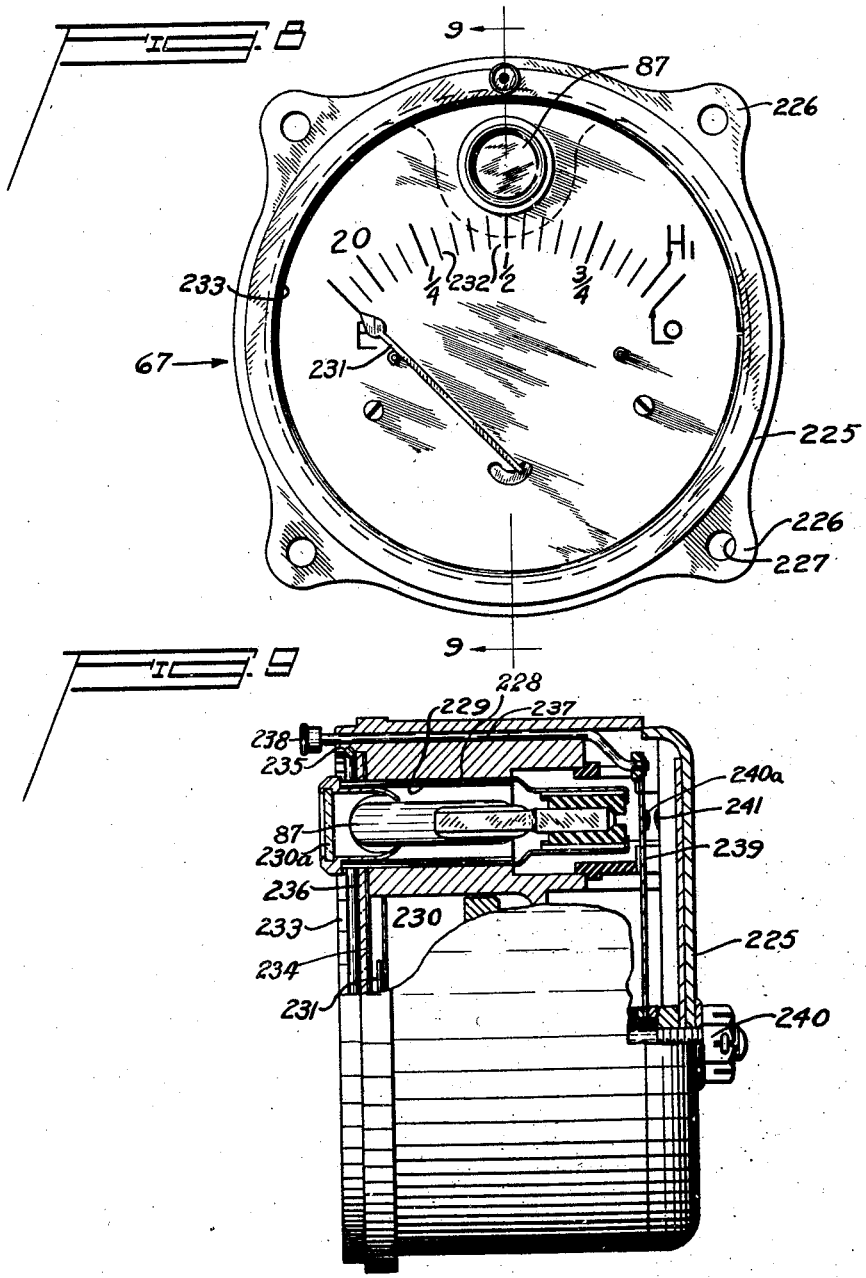

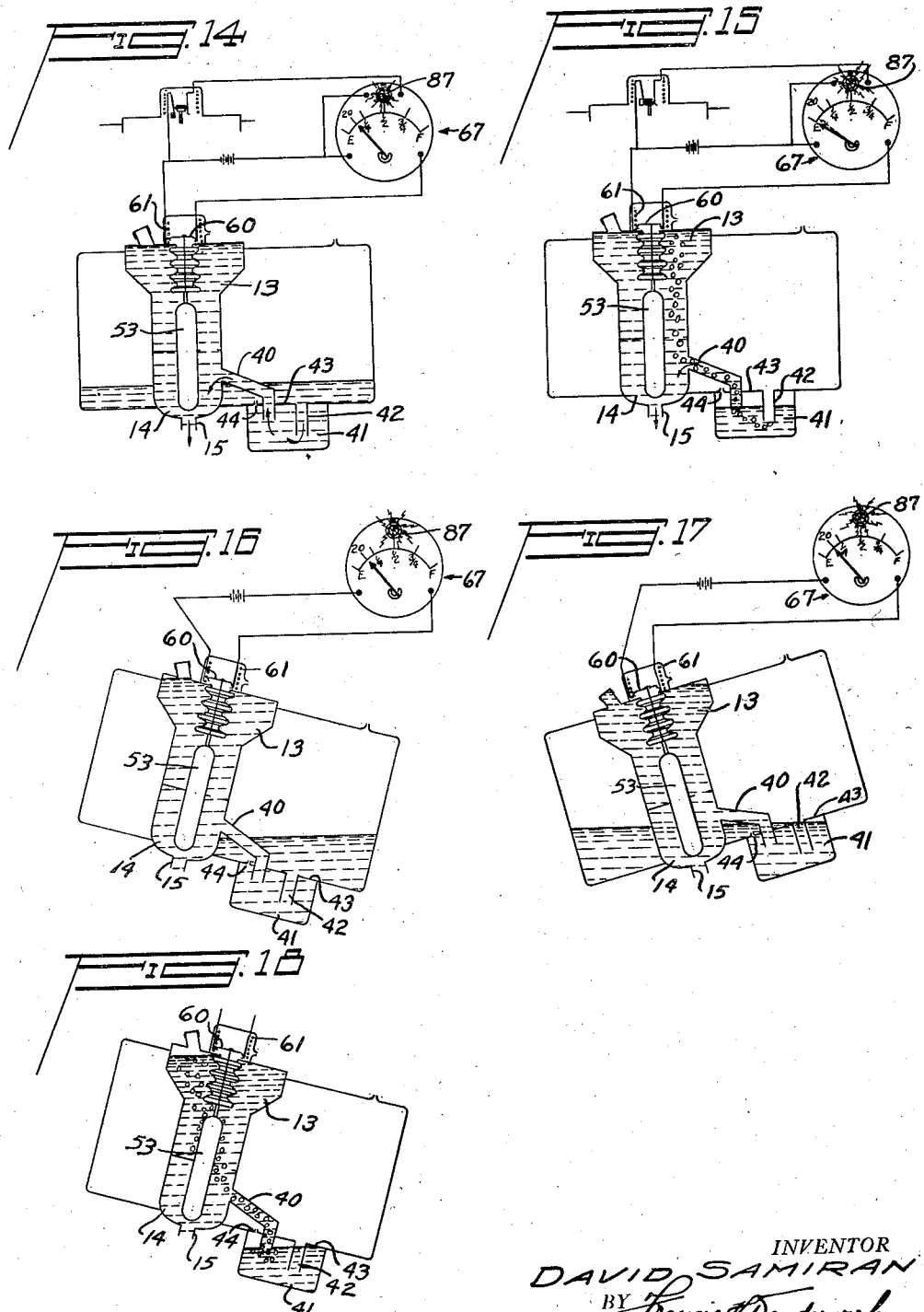

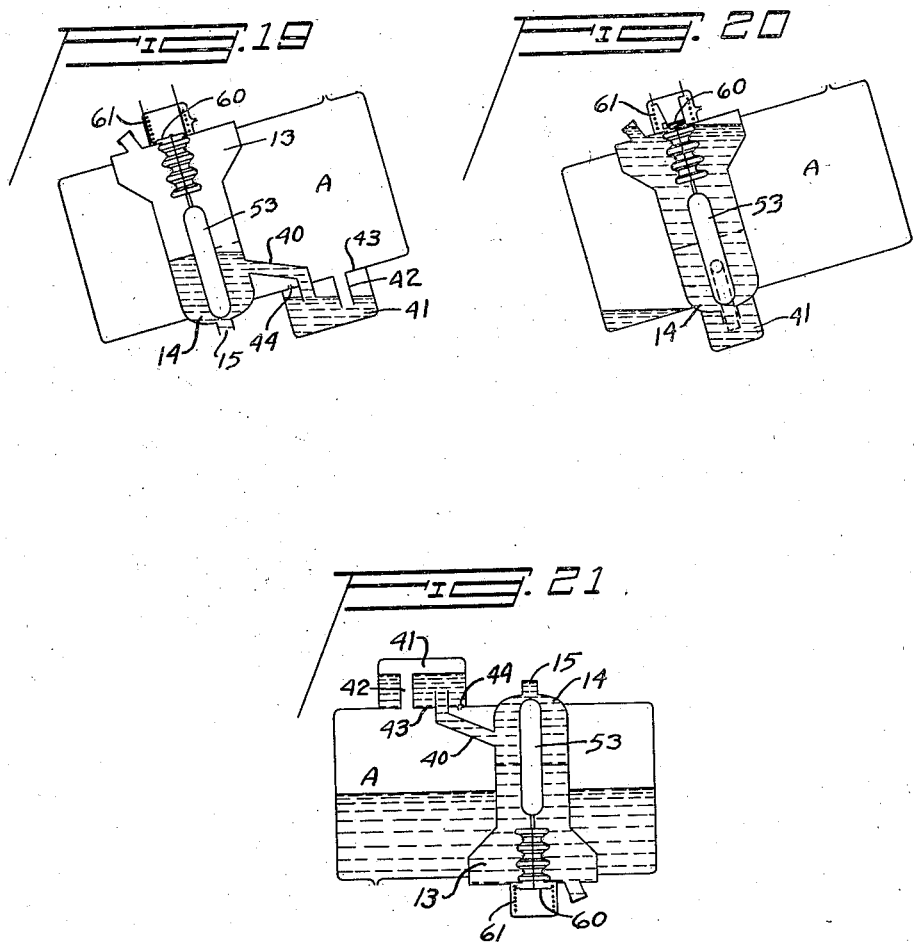

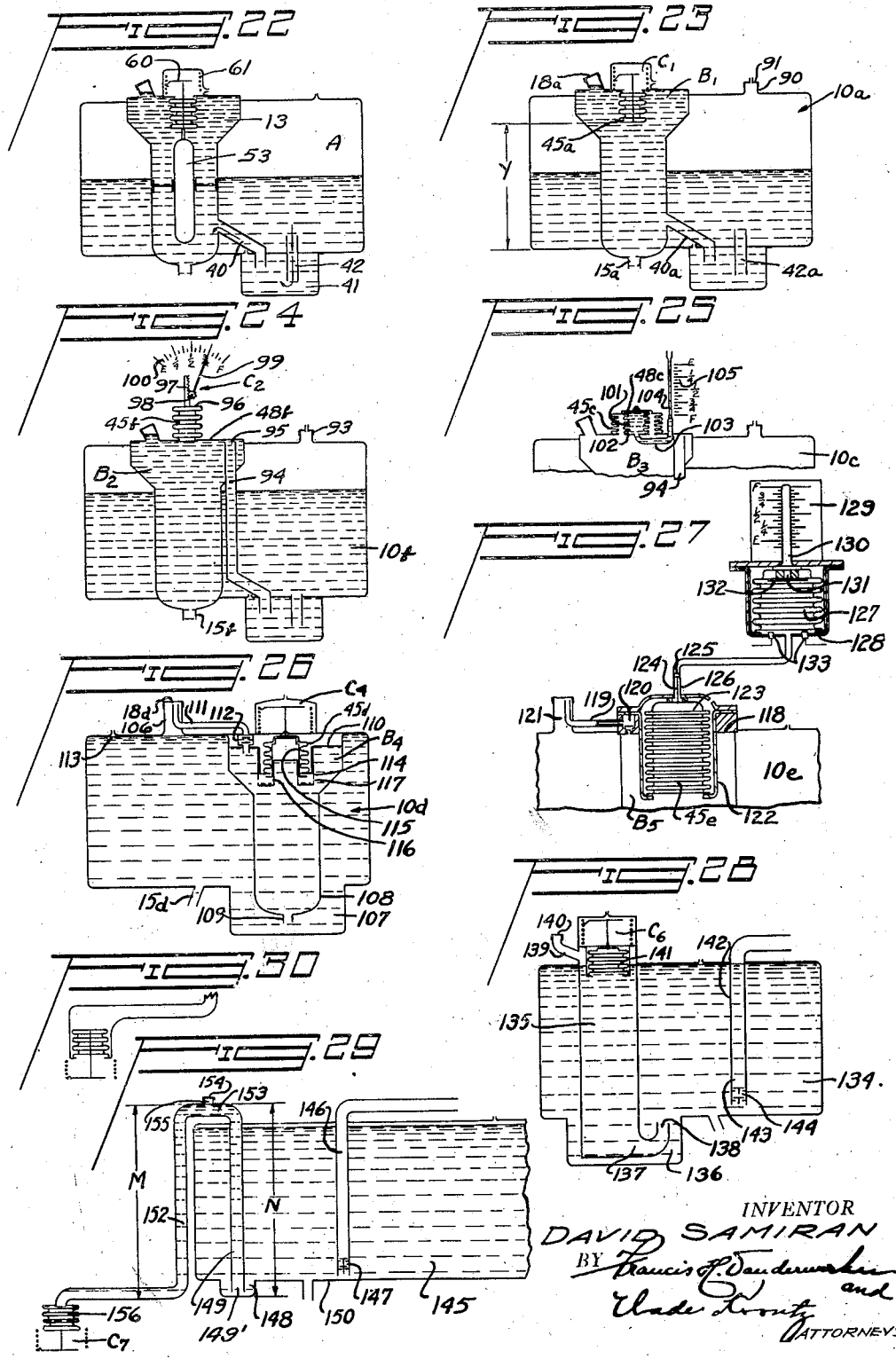

Feb. 2, 1937.  D. SAMIRAN  2,069,279
LIQUID MEASURING APPARATUS
Filed April 16, 1935  9 Sheets-Sheet 9
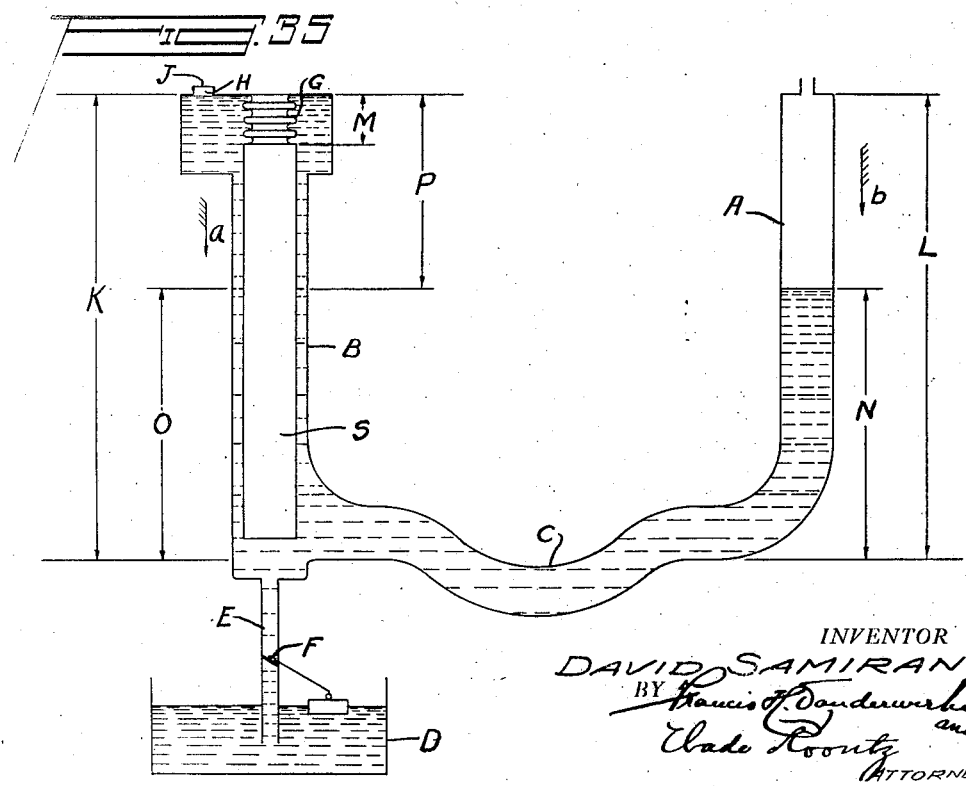
INVENTOR
DAVID SAMIRAN Patented Feb. 2, 1937

2,069,279

UNITED STATES PATENT OFFICE 2,069,279

LIQUID MEASURING APPARATUS

David Samiran, Dayton, Ohio

Application April 16, 1935, Serial No. 16,625

17 Claims. (Cl. 73—82)

(Granted under the act of March 3, 1883, as amended April 30, 1928; 370 O. G. 757)

The invention described herein may be manufactured and used by or for the Government for governmental purposes, without the payment to me of any royalty thereon.

The present invention relates generally to apparatus for measuring liquid levels and more particularly to apparatus for measuring and indicating the liquid contents in fuel tanks for automotive vehicles as well as various other types of fuel storage chambers.

Although the present invention has a wide field of application it is especially adaptable for use in connection with aircraft and involves an apparatus which operates to not only plainly and visually indicate the liquid contents or amount of fuel remaining in any one as well as a plurality of main and/or auxiliary fuel tanks or reservoirs but to automatically operate a suitable signal or signals of a type or types designed to attract the eye when the liquid is any one of the main tanks or auxiliary tanks has reached a predetermined point which may be termed the reserve level.

Heretofore, in conventional aircraft fuel systems it has been the practice to provide each main and/or auxiliary fuel tank with a series of so-called "standpipes" of progressively increasing predetermined heights which were individually connected to the carburetors of the engines through complex systems of pipe lines, valves, fuel pumps and other accessories.

As the fuel in each tank was consumed by operation of the engines, the level of the liquid in the live tank would, in successive stages, reach the upper level of each standpipe. When the level of the liquid in the tank would fall below the upper end of this standpipe, air would be drawn into the main fuel lines and cause a sputtering or misfiring of the engines. In only this manner was there any indication given to the pilot of the approximate measure of the liquid remaining in the particular tank being used.

Misfiring of the engines necessitated prompt attention on the part of the pilot in opening the proper valve or valves connecting the next smaller standpipe with the carburetors, so that the necessary flow of fuel into the carburetors of the engines would continue uninterrupted.

The primary disadvantage in a system of this character resides in the fact that no warning or signal of any nature is given to the pilot, other than misfiring of the engines and, in many instances, particularly in the case of cross-country flights, or over mountainous terrain, fatal crashes have occurred, caused by the sudden loss in altitude resulting from sudden engine failures or misfiring.

Obviously, in systems of this type a multiplicity of devices of a manually operable nature are required, which result from the necessary distribution of the various fuel tanks in the fuselage and wings of an aircraft. These devices include, among others, fuel pipes, control valves, wabble pumps and the like, the purpose of the latter being particularly essential in order to clear the main fuel lines of trapped air or air pockets as soon as possible after misfiring occurs. This necessary additional equipment adds materially to the weight of an aircraft and is not only prohibitive from the standpoint of efficient aircraft design but the manipulation of the various valves and other accessories enumerated above tends to create considerable confusion in the mind of the pilot and to detract his attention from the proper operation of the aircraft.

Inasmuch as the mechanical devices enumerated above are not automatic in their nature, but depend, entirely, upon the judgment of the pilot for their operation, it is desirable to provide an apparatus which is fully automatic, that is to say, an apparatus which will continuously give the pilot definite and reliable information as to the quantity of fuel remaining in the tanks and to automatically signal him when the level of the liquid in the main tank has reached a predetermined reserve level.

The primary object, therefore, of the present invention is to provide a new and improved construction of fuel tanks incorporating an arrangement of means so constructed and arranged as will constantly indicate quantitatively the amount of fuel remaining in the main fuel tank and including means whereby a pressure responsive or pressure sensitive element in connection with an electrical device, controlled by the said pressure responsive element, causes the change from normal liquid level conditions to subnormal liquid level conditions in the main tank to be brought to the pilot's attention in a forceful manner.

A further specific object of the present invention is to provide in an apparatus of this character, a pressure sensitive element in connection with electrical or equivalent mechanical means controlled by the said pressure sensitive element which operates in such a manner as to constantly and visually indicate the quantity of fuel remaining in the main fuel tank and to cause the change from normal liquid level conditions to subnormal or reserve level conditions in the main tank or storage chambers to be indicated by causing a signal of a readily recognizable character to be given.

A still further important object of the present invention is to provide an improved construction of fuel storage tank including an emergency reservoir in operative communication with the main storage tank and incorporating an arrangement of means whereby a hydro-electrically operated pressure sensitive element and an indicating device which is electrical in character and controlled by the said pressure sensitive element operates to obtain the following desired results:

a. To indicate quantitatively and continuously the amount of fuel remaining in the main storage tank.

b. To automatically indicate when the fuel in the main storage tank has reached a predetermined reserve level by instantly emitting a readily recognizable signal of one character, caused by the change from normal liquid level conditions to subnormal or reserve level conditions in the main storage tank, and c. To sequentially indicate to the pilot when the reserve supply of liquid in the main storage tank is exhausted and the supply of fuel in the emergency reservoir is being consumed by simultaneously causing one or both of said first mentioned indications to give a readily recognizable signal or signals of an entirely different character, for example, by causing the movement of a pointer of an electrical instrument embodying an electric field for its operation to oscillate and simultaneously effect an intermittent flashing of a signal lamp.

A still further important object of the present invention is to provide an improved construction of fuel storage tank which incorporated a main storage chamber and an emergency reservoir, the latter being normally sealed to the atmosphere and so disposed in said main storage tank such that the liquid contents of the emergency reservoir are available for use only after the liquid contents of the main storage tank have been completely exhausted, this being true even though the main storage tank be in a complete inverted position.

A still further important object of the present invention is to provide in a tank construction of this character, a signaling device which operates automatically to indicate when the contents of the emergency reservoir are being consumed.

Another object of the present invention is to provide in a tank construction of this character, a pressure sensitive fuel level indicating device which incorporates a float capable of being adjusted to any desired buoyancy in liquids having different densities or different specific gravities, the purpose of the float being to control the movement of the pressure sensitive element within reasonable limits. By controlling the movement of the pressure sensitive device in one direction by means of a float of this type for example, when filling the main storage tank, the range of movement of the pointer incorporated in the indicating device may be varied proportionally as the buoyancy of the float is varied. Consequently, if the float is adjusted so as to obtain a desired buoyancy in a liquid of a given density and the main storage tank is filled with a liquid having a density greater, or less than the liquid of given density a scale reading will be obtained different from the scale reading obtaining were the float immersed in a liquid of the given density and thus afford a check as to the quality or grade of the fuel used in filling the tank.

These and other objects of the invention will become apparent from the following detailed description of my invention and from the drawings wherein—

Figure 1 illustrates diagrammatically the preferred embodiment of my invention;

Figure 2 is a view in side elevation of a fuel cap which is used for sealing to the atmosphere the emergency reservoir incorporated in my invention;

Figure 3 is a sectional view of the fuel cap taken on the line 3—3 of Figure 4;

Figure 4 is a top plan view of the fuel cap;

Figure 5 is a sectional view of the pressure sensitive indicating device incorporated in the emergency reservoir;

Figure 6 is a part sectional view taken on the line 6—6 of Figure 5;

Figure 7 is a sectional view taken on the line 7—7 of Figure 6;

Figure 8 is a view in front elevation of my liquid measuring device;

Figure 9 is a part sectional view taken on the line 9—9 of Figure 8;

Figure 10 is a wiring diagram illustrating the electrical connections for the liquid measuring device illustrated in Figure 8;

Figures 11 and 12 illustrate diagrammatically the operation of the float, pressure responsive element, and liquid measuring device illustrated generally in Figure 1 during the initial operation of filling the tank;

Figure 13 illustrates diagrammatically the operation of the apparatus during the time that the fluid in the main tank is being consumed;

Figure 14 illustrates diagrammatically the position assumed by the float, the pressure sensitive element and the liquid measuring device when the reserve level of the fluid in the main tank has been reached;

Figure 15 illustrates diagrammatically the operation of the apparatus at a time when the emergency supply of fluid in the emergency reservoir is being consumed;

Figures 16 to 20, inclusive, illustrate the operation of my so-called, "fluid trap arrangement" which operates to maintain a constant supply of fuel to the carburetors of the engine during various flying or landing attitudes of an aircraft;

Figure 21 illustrates diagrammatically the operation of my so-called, "fluid trap arrangement" with the main tank in a completely inverted position;

Figure 22 illustrates diagrammatically the structural embodiment of my invention illustrated in Figure 1 and which incorporates a float;

Figure 23 illustrates a modified form of my invention wherein the float of Figure 22 has been eliminated;

Figure 24 illustrates a further modification of the invention embodying a mechanically actuated fluid level indicating device;

Figure 25 illustrates a modified form of liquid measuring device incorporated in a tank construction of the type illustrated in connection with Figure 24;

Figure 26 illustrates a further modification of the invention incorporating a check-valve in the emergency reservoir adapted for maintaining the same sealed to the atmosphere;

Figure 27 illustrates a modified form of remote control indicating device;

Figure 28 illustrates diagrammatically the application of my emergency reservoir to an underground storage tank of conventional design;

Figures 29 and 30 illustrate diagrammatically a "syphon" type indicating device which operates substantially upon the principles of Figure 1, the same being incorporated in an underground storage tank.

Figure 31 illustrates diagrammatically a storage tank and emergency reservoir arrangement incorporating a visual type indicating device;

Figure 32 illustrates a modified form of the invention in which a so-called "bell jar" is incorporated in the emergency reservoir;

Figure 33 illustrates diagrammatically a modified form of the invention which incorporates a float and "bell jar" arrangement of a type approximating that illustrated in Figure 32;

Figure 34 illustrates a modified form of the invention incorporating a float and "bell jar", the latter being pivotally mounted in a manner approximating that shown in Figure 33;

Figure 35 is a schematic representation of the apparatus in its simplest form.

The system as shown in Figure 1 may incorporate any number of main fuel storage chambers and one or more auxiliary tanks depending upon the type of aircraft in which it is contemplated using the same. It is readily apparent that the system is equally adaptable to an underground storage system using any one or a plurality of main and/or auxiliary storage tanks.

For the sake of clarity, I prefer first to describe the system in its simplest form, that is to say, a system which comprises one main fuel tank and an auxiliary tank in operative communication with the main fuel tank. Inasmuch as the main and the auxiliary fuel tanks are identical in general construction, the details of construction of the main tank 10 will be described. This tank, generally illustrated in Figure 1, comprises a main fuel storage chamber A in which are disposed in spaced relationship a plurality of baffle plates 12 of conventional design. A secondary fuel storage chamber B hereafter referred to as an "emergency reservoir" is positioned within the main fuel storage chamber A and formed as an integral part of the main tank during assembly.

This emergency reservoir comprises a casing 13, herein shown as of cylindrical shape, which is supported within the main fuel storage chamber A by the baffle plates 12. The lower end of this "emergency reservoir" terminates in a sump 14 which projects through the lower wall of the main fuel storage chamber A. The sump 14 is provided with a conventional fluid outlet 15 and constitutes together with the fuel line 15a a suitable passageway for fuel to the engine or engines.

The upper end of the casing 13 is provided with a funnel-like enlargement 16 which terminates substantially flush with and may be fixedly secured in any suitable manner, as by brazing or welding or the like, to the top wall of the main tank 10. This funnel-like enlargement includes a filler neck 17 and a filler cap 18 of the type more particularly illustrated in Figures 2 to 4, inclusive. Referring more particularly to Figure 3, the filler cap 18 is of a self-sealing type and comprises generally a body portion 19 having an externally threaded lower end 19a adapted for being tightly screwed upon the internally threaded upper portion 19b of the filler neck 17. An inner bracket 20 provided with arms 21 is welded or otherwise suitably secured to the one side of the body portion 19. The arms 21 have pivotally attached thereto secondary arms 22 of a secondary bracket 23 which is pivotally attached to a depending member 24, the latter being fixedly secured centrally of the filler cap plate 25. The plate 25, as best shown in Figure 3, may be provided with a suitable sealing gasket 25a which is tightly seated against the upper flanged end 19c of the body portion 19, when the filler cap plate 25 is in its closed position.

The inner bracket 20, is also formed with a depending portion 27 provided with arms 28, which have pivotally connected thereto at their outer ends the stem portion 29 of the plunger 30 operating in a cylinder 31. This cylinder pivots on the bracket arms 22 heretofore mentioned at a point adjacent their points of pivotal connection with the bracket arms 23. A coiled spring 32 surrounding the stem 29 bears at its one end against the lower end of the cylinder 31 and at its opposite or upper end against the plunger 30 and operates to normally maintain the gasket 25a of the cap 25 positively seated against the upper flanged end of the body portion 19. To dampen the longitudinal movement of the plunger 30 in the cylinder 31, the stem 29 of the plunger 30 is formed with a central bore 33 which communicates with the atmosphere through a lateral opening indicated by the numeral 34. The upper end of the bore 33 is cone-shaped and has freely positioned therein a small ball 35 which acts to check or dampen the movement of the cap 25 during its closing movements.

The cap 25 is provided externally with a pivotally mounted handle 36 having a gripping portion 37 to permit the handle to be readily grasped by the fingers of the hand and moved into the dotted position indicated in Figure 3. This handle under the action of a torsion spring 38 is normally positioned substantially flushed with the top of the cap 25.

By observing Figure 2 it will be seen that when the cap 25 is moved into its upper open position as indicated by the full lines, the pivot points of the cylinder 31 will have moved to the left and beyond the dead center position. The natural tendency of the spring 32 under these circumstances will be to hold the cap in its open position. Any force exerted against the cap toward the right, as viewed in Figure 2, will move the upper pivotal connection of the cylinder 31 to the right and beyond the dead center position so that the spring 32 by reason of its then compressed condition will tend to snap the cap tightly into a closed position and effectively seal the filler neck against the admission of atmospheric air. The downward movement of the cap 25 will at this time be dampened by reason of the metering action obtained from the ball check valve arrangement heretofore described.

The lower end of the casing 13 has connected thereto a fuel conduit 40 which communicates with a sump 41 formed in the lower end of the main storage tank 10. A second conduit 42 is mounted in the sump portion 41 in an upstanding position, the lower end of which is in communication with the sump portion 41 and the conduit 40. The upper end of the conduit 42 extends into and has communication with the main storage chamber A. The sump 41 is provided with an upper wall 43 which forms a baffle between the said sump and the main storage chamber. An orifice 44 of preformed flow control characteristics is provided in the upper wall 43, the purpose of which will be described hereafter in greater detail. It should also be noted that the lower end of the conduit 42 is positioned considerably lower than the lower end of the conduit 40. These conduits together with the sump 41 will be hereinafter referred to as a "fuel trap", the purpose of which will be set forth in greater detail as the description proceeds.

Liquid measuring device

A liquid measuring device indicated by the letter C is mounted in the emergency reservoir, the purpose of which is to provide accurate means for measuring and indicating the liquid contents in the main storage chamber A. This device, as best shown in Figure 5, comprises generally a pressure responsive controlling element or bellows 45, the upper end 46 of which is secured to a plate 47 carried by the upper wall 48 of the casing 13 by machine screws 48a.

This bellows is disposed within a suitable housing 49 and formed with an upper flange 50 securely seated on the upper wall 48 and between the plate 47 and the said upper wall. An orifice 47a provided in the plate 47 forms a means of communicating atmospheric air to the interior of the bellows 45. The lower end of the bellows 45 carries a threaded coupling 51 for receiving thereon in threaded engagement a sleeve 52. This sleeve constitutes a support for a cylindrical float 53 which is positioned centrally within and extends substantially throughout the entire length of the casing 13.

The float 53 is supported in spaced relationship from the casing 13 at its lower end portion by means of a baffle plate 54 having a bearing portion 55 in which the float is adapted for sliding movement. This baffle plate is provided on its one side with an aperture 56 which forms a passage for the fuel and air from the upper to the lower portion of the emergency reservoir. The float 53 is of a type embodying those principles set forth in my co-pending application Serial Number 448,391 filed April 29, 1930, and my reissue Patent Number 19,227—for example, a float which may be adjusted to any desired buoyancy so as to render it capable of floating in a predetermined position in liquids of different density or different specific gravities and capable of performing certain work in said liquids.

An upstanding rod 57 is connected at its lower end to the coupling 51, the upper end of which passes through a suitable opening formed in the lower end of a so-called "control box" 59, housing a spirally wound resistance element 60 of an electrical rheostat.

The upper end 58 of the rod 57 carries a wiper element 61 consisting of two spring arms, the one spring contact arm 62 of which is arranged for slidable contact over the convolutions of the spirally wound resistance element 60, the other arm 63 being adapted for slidable electrical contact along the length of a metallic strip 64 carried within and insulated from the housing 59. The terminal ends 65 and 66, respectively, of the metallic strip 64 as well as the terminal ends of the resistance element 60 are connected in series relationship with an electrical indicator 67, generally illustrated in Figures 8 and 9, and a source of electrical energy, such as a battery 68 the particular electrical arrangement of which is shown in greater detail in the wiring diagram of Figure 10.

The upper end 58 of the rod 57 also carries a circular insulation block 69 which forms a support for an annular ring 70, which latter bears on its one side against a metallic contact strip 71 supported in insulated relationship within the control box 59 heretofore mentioned. The opposite side of the angular ring 70, makes slidable contact with a secondary metallic spring strip 72 which is formed at its lower extremity with a U-shaped end portion 73. A plurality of "make and break" terminal strips 74 are disposed within this U-shaped end portion and separated from one another by alternate layers of insulation material generally indicated by the numeral 76. These terminals together with the insulation strips 76 are firmly held in place in the U-shaped end portion 73 by means of a rivet 75, the latter forming a convenient means of effecting electrical contact between the strips 74 and the metallic spring strip 72.

The metallic strips 71 and 72 are provided with terminal connections 77 and 78, respectively, adapted for electrical connection with a signal lamp mounted in the indicator 67 through the battery 68 mentioned above in connection with Figure 10.

To prevent the entrance of fumes into the control box 59 there is provided above the bellows 45 a stuffing box comprising a plurality of sheets of suitable material such as rubber or the like 79 each having a central opening 80 through which the rod 57 passes and which are secured in fixed relationship therewith by means of a plate 81 which is secured to the lower wall of the control box 59 by means of lock nuts 82. Consequently as the bellows 45 expands or contracts the rod 57 will be freely movable up or down in the openings of the rubber sheets and at the same time the fumes surrounding the bellows are effectively prevented from entering the control box 59 and thereby insure against fire hazards.

The lower end of the housing 49 has formed therein a reduced annular portion 83 which forms a guide for the upper end of the float 53. A slot 84 is formed in one side of the annular portion 83 in which a pin 85 carried by the float 53 is capable of longitudinal sliding movements. By means of this pin and slot arrangement the float 53 is capable of free longitudinal movement within the emergency reservoir and at the same time prevented from moving angularly therein.

Principle of operation

The principle upon which the invention is founded may be best explained in the following detailed description taken in connection with Figure 35 of the drawings.

Fundamentally, the main tank and emergency reservoir, together with the fuel trap which includes the sump 41 and the conduits 40 and 42 form, in effect, a U-shaped tube similar to that illustrated in Figure 35, which comprises the main branch A and emergency branch B and a connecting portion C. Let us assume that the branch B is representative of the emergency reservoir and the branch A, the main tank. Let us further assume that the connecting portion C represents the fuel trap and that it communicates with a container D (carburetor) by means of a pipe E and that the latter is provided with a float valve F, the purpose of which is to maintain the lower end of the pipe E sealed to the atmosphere.

A controlling element such as a bellows G is positioned in the upper end of the emergency branch B and so disposed therein such that the closed or lower end of the bellows extends into the branch B. An opening H constituting in effect a filler neck is also provided in the upper end of the branch B capable of being sealed to the atmosphere by a closure member J (filler cap).

The branch A, which has a height corresponding to the height of the branch B, is open to the atmosphere.

Now let us completely fill both branches A and B with a liquid and thereafter seal the opening H to the atmosphere by means of the closure member J, assuming of course that the outlet opening of the pipe E is sealed to the atmosphere.

If the U-tube, under these circumstances, were quickly turned into an inverted position, it becomes evident that the column of liquid in the branch A will drain therefrom but that the column of liquid in the branch B will remain trapped or suspended therein. Obviously, a static head of liquid K (positive pressure) will be acting upon the bellows G tending to collapse it a predetermined amount. Now, if the U-tube is returned to its normal position, the same static head of liquid K will tend to expand the bellows downwardly or in the direction of the arrow "a". Thus a suction or negative pressure or a presusre of constant height K is tending to pull downward upon the bellows.

The aforegoing assumption as to the negative pressure acting upon bellows exists when there is no liquid in the main branch A.

But suppose that both branches A and B are completely filled with liquid. The force of the column of liquid K in the branch B will be in the direction of the arrow "a"; it is equally true that the force of the column of liquid L in the branch A is in the direction of the arrow "b". Hence these two forces will have an equal and opposite reaction upon one another so that when both branches A and B are completely filled there will be no active force tending to collapse the bellows other than a force of negligible magnitude represented by the head M. In other words the bellows will be positioned substantially in its normal position.

Suppose, however, that the container D which is representative of the carburetor of an engine, is drawing upon the supply of liquid in the U-tube. Obviously, as long as the outlet of the pipe E is sealed to the atmosphere, the liquid in the branch B will remain trapped or confined therein and consequently the liquid will be supplied to the container D from the branch A, it being under atmospheric pressure. This results in a lowering of the level of the liquid in the branch A. When the level of the liquid in the branch A has dropped to a height N, theoretically a similar column of liquid of height O in the branch B will exactly counterbalance the force of the column N in branch A. This being true a column of liquid P, of negative pressure, will at this time be acting upon the bellows C tending to expand it downwardly or in the direction of arrow "a". In other words the negative pressure or suction force tending to expand the bellows will be the differential in static head pressures between the columns of liquids in branches A and B. As the level of the liquid in the branch A progressively drops the suction force acting upon the bellows will be proportionately increased so that when the column of liquid in the branch A has dropped to zero level, the magnitude of the suction force acting upon the bellows will be at its maximum. Consequently, if we assume that the bellows G is connected to the wiper element of a liquid measuring device of the type hereinabove described, an indication of liquid contents in the branch A will be obtained. It will thus be seen that in my improved apparatus, the governing element of the indicating device (the bellows) is controlled directly by the weight of the confined liquid column in the emergency reservoir, which weight varies in direct proportion to the variation in level of the body of liquid in the main or storage tank of the apparatus. It is also evident that the effective length of the confined liquid column which acts to determine the position of the governing element by the pull due to its weight is the length between surface of the liquid in the tank at any movement and the upper end of the governing element.

The principle of operation of the invention thus far has been confined to the use of a bellows intended for operating the wiper element of a suitable measuring device.

To obtain absolute measurements of liquid contents in an apparatus of this character, for example, in the modification of the invention illustrated in Figure 1, I have found it desirable to provide a float of the type designated hereinabove which operates in conjunction with the bellows to obtain correct indications of liquid contents both in filling and in emptying the tank. This float is designated by the letter S in Figure 35 and is shown as being connected to the bottom or closed end of the bellows G.

*Operation with float attached*

In accordance with the law of buoyancy known as the "Archimedes" principle, any body immersed in a fluid at rest is buoyed up by a force equal to the weight of the fluid which is displaced by the body, and the mass of liquid displaced by a body floating in it is equal to the mass of the floating body.

In attaching a float to the bellows G (and with no liquid in the branch B) the weight of the float will expand the bellows from its normal position, in other words the bellows will be under a tension the force of which is equal to the weight of the float. Initially I have adjusted the float to a fluid of known specific gravity (high test gasoline).

Now let us assume that the system illustrated in Figure 35 is completely empty and that with the closure member J removed we begin pouring liquid into the branches A and B.

At the same instant that the float displaces any liquid in the branch B a buoyant force begins to act upon the float; that is the float will be buoyed up by a force equal to the weight of the liquid it displaces. It follows that as the level of the liquid rises in the branches A and B, the float will move upwardly proportionately with the rise in level of the liquid. Obviously the tension on the bellows gradually decreases with the rise in level of the liquid.

Continued rise in level of the fluid in the branch B effects an increase in displacement of fluid by the float, the buoyant force of which is gradually increasing, and the bellows will be proportionately collapsed so that the buoyant force of the float will become stored in the bellows. When the float is completely immersed in the liquid in branch A its buoyant force will be at a maximum and the bellows will have been completely collapsed.

When both branches are completely filled with liquid the buoyant force acting upon the bellows will be the weight of the fluid displaced both by the float and the bellows. This buoyant force will be exactly counterbalanced by the compressional forces which have become stored in the bellows.

Both branches A and B being completely filled with liquid the opening H is sealed to the atmosphere by the closure member J and fluid is consumed by the container D (carburetor). The branch A being open to the atmosphere, fuel will be drained therefrom through the pipe E into the container. The column of fuel in the branch B will, however, remain trapped or confined therein by reason of its now sealed condition. As the level of the liquid in the branch A drops the suction force acting up the bellows tending to expand it will be the differential in static heads between the branches B and A. For example, when the liquid in the branch B has a head N the head of liquid acting upon the bellows will be the differences between the head N and the head K or that represented by the head P. At this time the float will be buoyed up by a force equal to the weight of the liquid displaced by the head O. Obviously, since an opposing force is stored in the bellows equal to the buoyant force O acting upon the float in addition to a suction pressure equivalent to a head of liquid P, the bellows together with the float, will move downwardly in direct proportion to the fall in level of the liquid in the branch A. It is also true that as the level of liquid in the branch A continues to drop the buoyancy of the float decreases, and at the same time the suction force acting upon the bellows will gradually increase and be at its maximum when the liquid in the branch A has reached a zero level.

Figures 11 to 15, inclusive, illustrate diagrammatically the operation of the fuel system and of the liquid measuring device through one complete cycle of operation. The operation is as follows:

With the filler cap 25 moved into an open position, as indicated in Figure 2, fuel is poured into the emergency reservoir 13 and enters the main storage chamber A through the conduits 40 and 42 heretofore mentioned. At this time the float 53 will have moved into its lowermost position in the emergency reservoir.

As the liquid in the main storage chamber A rises, the liquid in the emergency reservoir 13 will rise also and seek a level coincident with the level of liquid in the main storage chamber by reason of the fact that the liquid in both the emergency reservoir and the main storage chamber are at this time under atmospheric pressure. As the level of the liquid rises in the emergency reservoir, the float will be displaced upwardly and move the wiper element 61 along the convolutions of the resistance element 60. The movement of the float upwardly is directly proportionally to the rise in level of the liquid in the main storage chamber, for example, when the main storage chamber is one-quarter full the float will have been displaced upwardly a distance equal to one-fourth of its range of movement by reason of the fact that the buoyancy of the float is at this time one-quarter of its total buoyancy.

It follows that when the level of the liquid in the main storage chamber has reached the three-fourths level, the buoyancy of the float will be three-quarters of its total buoyancy and the indicator 67 will give a corresponding dial reading. When the main storage tank is completely filled, as best shown in Figure 12, the float will be totally immersed in the liquid of the emergency reservoir. Consequently, the buoyancy of the float is at its maximum and the pointer of the indicator 67 will give a full scale reading. When this condition exists the bellows 45 will have been completely collapsed and the total buoyant energy of the float will be stored in the bellows.

Inasmuch as the float is of a type set forth in my patent applications above identified, wherein I have described a means of adjusting a float of this character to liquids having different densities, it becomes apparent that if the storage tank 10 is filled with a liquid having a certain specific gravity, for example, low test gasoline, and the float has been adjusted to that same grade of gasoline, the buoyant force of the float when totally immersed in this liquid will be at its maximum and a correct scale reading will be obtained.

If, however, with the float 53 adjusted to low test gasoline, should the main tank be filled with a liquid of different specific gravity, such, for example, as high test gasoline, the buoyant force of the float when totally immersed in this second liquid will be less, consequently the energy stored in the bellows will be less than in the former case, and the indication given by the pointer of the indicator 67 will be less than a full scale reading. By utilizing a float of the character above set forth, the energy of the float is not only utilized to operate a mechanism which will indicate the quantity of gasoline in the tank but it affords a means of accurately checking the grade of fuel which has been poured into the tanks.

With both the emergency reservoir and the storage chamber A completely filled with fuel the filler cap 25 is moved into a closed position to effectively seal the emergency reservoir 13 to the atmosphere.

As the fuel is being consumed by the engine or engines, the level of the liquid in the main storage tank drops, passing from the main storage chamber A through the conduit 40 and 42 and into the carburetors of the engines through the coupling 15 and cooperating pipe lines. Inasmuch as the lower ends of the conduits 40 and 42 are always immersed by the liquid in the main storage chamber A and sump 41 and the top of the emergency reservoir is sealed to the atmosphere, air cannot enter the emergency reservoir and consequently the fuel trapped in the emergency reservoir will remain suspended therein. Obviously as long as the emergency reservoir is sealed to the atmosphere and the fuel line to the carburetor is completely filled with a liquid, a column of liquid pressure is acting upon the bellows 45 tending to expand it. The head of liquid acting upon the bellows and tending to expand it is equivalent to the column of the liquid trapped in the emergency reservoir in addition to the atmospheric pressure acting upon the exposed side of the bellows.

It will of course be understood that the column of the liquid in the main storage chamber A, being under atmospheric pressure, will, when the main storage tank is completely filled, exert an equal and opposite pressure upon the bellows. When the level of the liquid in the main storage chamber A drops one, two or three inches, the column of liquid or static head of liquid tending to expand the bellows will be one, two or three inches, respectively, or in other words, the pressure tending to expand the bellows will as hereinabove set forth be the differential in pressures between the fixed column of liquid in the emergency reservoir and the variable column of liquid in the main storage tank 10. Obviously, the lower the level of the liquid in the main storage chamber A becomes, the greater will be the suction force of the liquid in the emergency reservoir acting upon the bellows tending to expand it.

Obviously the downward movement of the bellows and float controls the movement of the wiper element 61 of the rheostat which in turn actuates the pointer of the indicator 67 to accurately indicate the level of liquid in the main storage tank.

As best shown in Figure 5, the metallic spring strip 72, heretofore mentioned, is provided with an adjusting screw 86 capable of being operated to move the contact 72 fore and aft, that is to say, toward or away from the axis X—X of the annular ring 70. The purpose of providing this adjustment is to effect an electrical connection between the annular ring 70 and the spring strip 72 at predetermined positions within the range of downward travel of the bellows 45 and close the circuit to a signal lamp 87 mounted in the indicator 67, when the liquid in the main storage chamber A has reached a predetermined reserve level. Obviously, the flashing of this lamp will give a readily recognizable signal to the pilot when this predetermined reserve level of gasoline in the main storage chamber A has been reached. The screw 86 may be so adjusted such that a flashing of the lamp will occur when any desired amount of fuel, say twenty, thirty or forty gallons, remains in the main tank 10. This signal lamp will remain lighted until all of the gasoline in the main tank has been used. When the fuel in the main tank 10 has been completely exhausted, the pointer of the indicator 67 will point to the zero reading on the dial of the indicator.

As illustrated in Figure 15 when the level of the liquid in the main tank falls below the level of the lower end of the conduit 40, bubbles of air will enter the emergency reservoir 13 and rise to the top of the liquid therein. The admission of air into the emergency reservoir breaks the seal momentarily and permits a portion of the liquid to flow from the emergency reservoir into the carburetor of the engine. At the same time some of the released liquid in the emergency reservoir will pass by action of gravity through the conduit 40 and into the sump 41 in an amount sufficient to again seal the emergency reservoir to the atmosphere. Continued consumption of fuel by the engine will effect an intermittent sealing and unsealing of the emergency reservoir accompanied by a gradual lowering of the liquid level in the emergency reservoir in successive stages. This intermittent sealing and unsealing of the emergency reservoir and consequent lowering in level of the liquid therein operates to agitate the liquid and effect an oscillation of the float 53 which at this time has assumed the position shown in Figure 15, and the annular ring 70 will have reached the center layer 76a of insulation material. As the float oscillates first in one direction and then in the other, the annular ring 70 will in rapid succession make contact with the contacts 74 heretofore mentioned. Consequently, the character of the signal emitted by the signal lamp 87, which prior to this time has been a continuous glow will change and the signal emitted by the lamp 87 will become intermittent in character. At the same time the pointer of the indicator 67 will begin to oscillate over the zero graduation on the scale 69, caused by the make and break contact of the arm 62 with the end convolution of the resistance element 60.

From the foregoing description it becomes apparent that I have provided means whereby an intermittent flashing of the signal lamp 87 will be obtained simultaneously with a second signal, for example, an oscillation of the pointer of the indicator 67 over the indicator dial at the instant that consumption of the supply of fuel in the emergency reservoir is started, the character of these signals continuing as long as there remains any fuel in the emergency reservoir. Briefly, from the foregoing description, it will be observed that a constant quantitative indication of the fuel in the main storage chamber will be given the pilot not only in filling but in emptying the tank or tanks. As soon as the fuel in the main tank has reached a predetermined reserve level, an indication of one character, for example, lighting of the signal lamp 87, will be obtained to visually signal the pilot that the reserve quantity of gasoline in the main tank is being used. Where several tanks are in use, as is the case in an aircraft, sufficient time is thereby given the pilot to open the main valve of another tank and obtain an uninterrupted flow of fuel into the carburetors of the engine. If all but one of the tanks have been emptied of their supply of fuel, the flashing on of the signal lamp gives the pilot an indication of the exact amount of fuel remaining in the last tank and consequently an approximate measure of the flying time still available in order that a safe landing may be made. When the fuel in the last main tank has become exhausted, an intermittent flashing of the signal lamp 87 occurs together with an oscillation of the pointer of the indicator 67 indicating that the supply of fuel in the emergency reservoir is then being used. Thus, even though the main supply of fuel in the main tank has become exhausted, there will always remain available for use a predetermined emergency reserve supply of fuel when extraordinary conditions arise.

The oscillation or bobbing action obtained by the float during the time that the supply of fuel in the emergency reservoir is being used may be best explained as follows:

Each time that the seal of the fluid trap is broken and bubbles of air enter the emergency reservoir, the trapped condition of the liquid in the emergency reservoir is momentarily relieved. Obviously at this time the fuel in the emergency reservoir tends to drop under the action of gravity and in so doing the float and bellows are imparted a perceptible downward motion. The sudden outflow of fuel through the conduit 40 will be suddenly checked by the rise of fuel in the sump 41 which acts to quickly seal the end of the conduit 40. This sudden stopping of the flow of fuel through the conduit 40 will instantly cause a momentary perceptible rise in the level of liquid remaining in the emergency reservoir and the float in responding to this change in level will be momentarily moved upwardly and effect an intermittent flashing of the signal lamp 87 together with an oscillation of the pointer of the indicator.

*Operation of fuel trap*

The fuel trap heretofore mentioned which includes the sump 41, upper wall 43, and the conduits 40 and 42 is so positioned with respect to the emergency reservoir 13 and the main storage chamber A such that the head of liquid in the emergency reservoir will under ordinary conditions be retained therein irrespective of the position of the main tank. Figures 16 to 21, inclusive, are illustrative of the manner in which the fluid trap cooperates with the emergency reservoir to maintain the sealed condition of the emergency reservoir irrespective of the position the main tank may occupy during different flying attitudes of an aircraft.

In each of the aforementioned figures, it is to be understood that the fuel trap is positioned on the longitudinal center line of the main tank 10 and disposed rearwardly with respect to the emergency reservoir. Referring more particularly to Figure 16, the main tank and emergency reservoir are shown in the positions they will assume during a climbing attitude of the aircraft and with the level of the fuel in the main storage chamber A below the reserve level condition. In this position it will be noted that the lower end of both the conduits 40 and 42 lie well below the surface of the fuel remaining in the main storage chamber A. Consequently the sealed condition of the fuel trap remains unchanged and the fixed head of fuel trapped in the emergency reservoir will remain therein.

Under similar circumstances were the aircraft maneuvered into a diving attitude, the main tank 10 and emergency reservoir will assume the position illustrated in Figure 17. The movement of the tank into this position will cause the fuel remaining in the main storage chamber A to flow towards the lower end of the main tank or towards the left as viewed in Figure 17. The upper wall 43 of the fluid trap will, however, baffle at this time the major portion of fuel which is trapped in the sump 41 and prevent any material loss of fuel therefrom. As a consequence the lower end of the conduits 40 and 42 will lie well below the level of fuel in the sump 41 and thereby prevent the entrance of air bubbles into the emergency reservoir. Obviously under these circumstances the head of liquid in the emergency reservoir will remain trapped therein. It is to be understood that during this time, as in the condition stated above in connection with Figure 16, the signal lamp 87 will be lighted indicating to the pilot that the level of the liquid in the main tank is below or at least has reached the reserve level conditions stated hereinabove.

Figure 18 illustrates the operation of the emergency reservoir and fuel trap during a climbing attitude of the aircraft and after the consumption of fuel in the emergency reservoir has started. During climbing and with the level of the fuel in the sump 41 just below the lower end of the conduit 40 bubbles of air will enter the sump 41 through the orifice 44, pass through the conduit 40 and rise, as indicated, to the surface of the fuel in the emergency reservoir. At this instant the signal lamp 87 will begin to flash intermittently, indicating that the fuel in the emergency reservoir is being used. At the same time the pointer of the indicator 67 will begin oscillating over the zero indication on the dial of the indicator. Under these circumstances there will always remain trapped in the sump portion 14 of the emergency reservoir a predetermined head of fuel so that the outlet passage for the fuel through the fuel outlet 15 will always be well below the level of liquid in the emergency reservoir.

Figures 19 to 21, inclusive, are particularly illustrative of the fact that the flow of fuel into the carburetors of the engines will continue uninterrupted as long as there remains any fuel in the emergency reservoir.

Even though the aircraft is preparing to land, at which time the main tank 10 will be tilted rearwardly only as indicated in Figure 19, a sufficient amount of fuel will remain trapped in the lower end of the sump portion 14 of the emergency reservoir to cover the outlet 15 and prevent air being sucked into the carburetors. From the foregoing it will be apparent that the entire supply of gasoline, even down to the last few remaining drops in the system, may be utilized before air will enter the carburetors of the engine.

Figure 20 is illustrative of the fact that a sufficient amount of fuel will be trapped in the sump portion 14 of the emergency reservoir during banking attitudes of the aircraft to retain a supply of fuel in the emergency reservoir during that period.

As shown in Figure 21, the flow of fuel into the carburetors will continue uninterrupted and the head of liquid remain trapped in the emergency reservoir even though the tank be in an inverted position. While in this position the baffle plate 43 forming the top wall of the sump 41 will trap a sufficient amount of fuel in the sump 41 such that the open end of the conduit 40 will lie substantially below the level of the fuel now trapped in the sump portion. Consequently the atmospheric seal at this point remains unbroken, the head of liquid in the emergency reservoir remains intact, and the flow of fuel will continue uninterrupted through the outlet 15.

The description thus far has been limited in the sense that it appertains to an apparatus which incorporates a float of the type set forth in my patent application hereinabove identified which cooperates with the liquid measuring device to indicate the amount of liquid in the main storage chamber during the operation of filling the main tank 10. I have found, however, that the functions attributed to the float and the liquid measuring device working together, for example, indication of fluid contents both in filling the main tank and during consumption of the fuel therein may readily be accomplished (with certain reservations) by entirely eliminating the float from the apparatus.

A modification of the invention in which the float has been eliminated, is illustrated in Figure 23. For the sake of clarity the arrangement of the apparatus including the float, such as the main tank 10 liquid measuring device C, emergency reservoir B, and the so-called "fluid trap" including the sump 41 and the conduits 40 and 42 herein above described in connection with Figure 1, are diagrammatically illustrated in Figure 22 to more readily obtain a direct comparison with the modification shown in Figure 23 in which the float has been eliminated. In this modification of the invention (Fig. 23) it will be noted that the main tank 10a is substantially identical in general construction with that of the tank 10 shown in Figure 22. The only difference in the two tanks illustrated in Figures 22 and 23 resides in the fact that the tank 10a of Figure 23 is provided with a secondary filler neck 90 and a filler cap 91 of conventional design provided with a vent opening whereas, in the case of Figure 22, the main tank 10 is provided only with a vent opening. The emergency reservoir B' and the liquid measuring device C' are identical in construction with the emergency reservoir and liquid measuring device of Figure 1 or of Figure 22. This same is true as to the construction of the fluid trap including the conduits 40a and 42a. The main distinguishing feature of Figure 23 is that the float 53 of Figure 1 or of Figure 22 has been eliminated.

The operation of the modification shown in Figure 23 is as follows:

The emergency reservoir B' is provided with a filler cap 18a identical in construction with that of Figure 1. Initially in filling the main tank 10a, the filler cap 18a is open and fuel is poured into the main tank through the emergency reservoir B'. Inasmuch as the secondary filler cap 91 is vented to the atmosphere, its removal from the filler neck 90 is not necessary during the initial operation of filling the main tank. In filling the main tank at this time no indication of fluid contents (numbers of gallons) will be obtained until the level of the liquid in the emergency reservoir B' is sufficient to start compressing the bellows 45a, or when the level of the liquid in both the emergency reservoir B' and the tank 10a has reached a height indicated by the letter Y. Obviously when the main tank 10a and the emergency reservoir B' are completely filled, the bellows 45a will have been compressed an amount corresponding to the weight of the mass of liquid it displaces so that the liquid measuring device C' through its indicator (not shown) will indicate that the main tank 10a is completely filled with liquid. At this time the filler cap 18a is moved into a closed position thereby effecting a sealing of the emergency reservoir to the atmosphere.

The operation of the apparatus from this point is substantially the same as the operation of the apparatus shown in Figures 1 and 22. That is to say, as the fluid in the main tank 10a is consumed, a constant visual indication of the supply of fuel will be obtained. When the supply of fuel in the main tank has reached the predetermined reserve level a signal lamp (not shown) of the type set forth above in connection with Figure 1 will flash on indicating that the reserve supply of fluid in the main tank 10a is being used so that the pilot of the aircraft will have ample time to turn on the supply of fuel from a full tank. As long as the emergency supply of fuel in the emergency reservoir is not used, it is possible to refill the main tank with fuel and obtain an indication of fuel contents in the main tank 10a both in filling and in emptying it. The filling of the main tank at this time must be accomplished through the filler cap 91, otherwise the fixed column of liquid in the emergency reservoir will be destroyed. Once the seal, however, in the emergency reservoir is broken, the negative pressure which has been acting upon the bellows 45a tending to expand it will become zero and the bellows in returning to its normal position of rest will move the liquid measuring device upwardly. In so doing the pointer of the indicator will be moved to a full scale reading. Since the scale reading under these circumstances is erroneous the operation of the apparatus in the manner described herein above for initial filling must be repeated in order to correct the errors occurring in the pointer indication.

In Figure 24 a further modification of the invention is illustrated. In this modification, the main tank 10b is provided with a secondary filler cap 93 similar in construction to that of the secondary filler cap 91 shown in Figure 23. The liquid measuring device C² of Figure 24 operates without the use of the float described in connection with Figure 1. The emergency reservoir B² is substantially identical in construction with that of the emergency reservoir heretofore described in connection with Figure 1, being provided with a filler neck and a self-sealing cap of the type described hereinabove in connection with Figures 2 to 4, inclusive. It will be observed, however, that the conduit 94 which corresponds in function to the conduit 40 of Figure 1 is arranged in a slightly different manner. In this instance, instead of being connected to the lower end of the emergency reservoir, as is the case in Figures 22 and 23, the inlet end 95 of the conduit 94 is positioned adjacent the upper wall 48b of the emergency reservoir. Obviously in filling the main tank 10b the emergency reservoir B² must be completely filled before any liquid will enter the main tank 10b through the conduit 94. This means that an emergency supply of fuel will always be available, even though the level of the fuel in the main tank is completely exhausted or is substantially lower than the head of the fuel trapped in the emergency reservoir.

The emergency reservoir B² is provided with a bellows 45b similar in construction to the bellows 45 of Figure 1. In this case, however, the bellows 45b is in an inverted position that is to say, the closed end of the bellows extends above the upper wall of the emergency reservoir in the same manner as does the bellows 45 of Figure 1. The closed or upper end 96 of the bellows 45b has mounted thereon in upright position the lower end of a gear rack 97, which meshes with a pinion 98 carrying a pointer 99. This pointer is adapted for movement over a scale 100 suitably calibrated to indicate fluid contents in the main tank 10b.

A further modification of the invention is illustrated in Figure 25. In this modification, the construction of the main tank 10c, the emergency reservoir B³, the filler cap arrangement in the emergency reservoir and the main tank, respectively, and the arrangement of the conduit 94 are identical in construction with the corresponding parts hereinabove set forth in connection with Figure 24. The main distinguishing feature in Figure 25 over Figure 24 resides in the novel construction of the liquid measuring device. It will be noted that the bellows 45c, which corresponds in function to the bellows 45b of Figure 24 incorporates a secondary bellows 101, the lower end 102 of which is supported against movement by the upper wall 48c of the emergency reservoir. The lower end of the secondary bellows 101 has operatively connected thereto a tube 103 which is suitably joined to a vertically extended glass tube 104 disposed adjacent a suitable calibrated scale 105. With the bellows 101 in normal position the bellows 101 and the tube 103 are filled with a suitable colored liquid sufficient to bring the liquid level in the tube 104 adjacent the zero indication on the scale 105. Consequently, as the upper or movable end of the secondary bellows 101 is collapsed by the collapsing movement of the main bellows 45c, due to the differential in pressure between the head of fuel in the main tank and emergency reservoir, the colored liquid in the glass tube 104 will rise and indicate the level of the fuel in the main tank 10c.

One of the main distinguishing features in the modifications illustrated in Figures 24 and 25 over those features enumerated hereinabove in connection with Figure 23 resides in the construction of the indicating mechanism and the arrangement of the conduit 94. This conduit arrangement is believed to be particularly novel by reason of the fact that at no time is it possible to only partially fill the emergency reservoir. On the other hand the emergency reservoir must first be completely filled with fuel before any fuel will enter the main tank 10c thus insuring a predetermined emergency reserve supply of fuel at all times.

Another modification of the invention is illustrated in Figure 26. This modification of the invention provides a main tank 10d and an emergency reservoir B⁴ disposed therein in substantially the same manner as the emergency reservoir of Figure 22. A filler cap 18d of the type heretofore described in connection with Figure 1 and a filler neck 106 is provided in the main tank 10d. A sump 107 is formed in the lower end of the main tank 10d into which the lower end 108 of the emergency reservoir is extended and into which it discharges the arrangement being such that the lower outlet opening 109 of the emergency reservoir lies materially below the bottom of the main tank.

The upper wall 110 of the emergency reservoir has connected thereto a bypass line 111, incorporating a check valve 112, which extends at its one end into the filler neck 106 of the main tank. The main tank 10d is also vented to the atmosphere as indicated by the numeral 113.

In filling the main tank, the fuel is poured into the tank through the filler neck 106 and rises in the emergency reservoir through its bottom outlet opening 109. As the fluid rises in the emergency reservoir B⁴ the air which is present is permitted to escape from the emergency reservoir through the check valve 112 and thence into the atmosphere through the bypass line 111 thus insuring a complete filling of the emergency reservoir with fuel as well as a complete filling of the main tank. When fuel is consumed in the main tank the check valve 112 serves to maintain the emergency reservoir sealed against the admission of air in the event of a subsequent opening of filler cap 18d.

The upper wall 110 of the emergency reservoir carries a cylindrical sleeve 114 within which the bellows 45d is centrally disposed and to which the lower end of the bellows is fixedly secured. A secondary cylindrical sleeve 115 carried within the bellows 45d is adapted for slidable movement on a plunger 116 centrally fixed in the lower closed end of the main sleeve 114. This sleeve 114 is suitably apertured as at 117 so that the resultant suction pressure in the emergency reservoir B⁴ caused by the differential in column lengths in the main tank 10d and the emergency reservoir will act upon the bellows. The secondary sleeve 115 and plunger 116 constitute in effect a dampening means for dampening the movements of the pointer of the liquid measuring device C⁴ during operation of the apparatus.

Generally, the operation of the apparatus in this modification of the invention is as follows:

Fuel is supplied from the main tank 10d to the carburetors of the engine through the fuel outlet 15d. As the level of the fuel in the main tank 10d lowers a proportionate increase in the suction force acting upon the bellows is occurring within the emergency reservoir B⁴ (which during this time is sealed to the atmosphere by the filler cap 18d and check valve 112) the tendency of which force is to effect a collapsing of the bellows 45d and actuate the liquid measuring device C⁴. As in the case of Figure 1, when the fuel in the main tank 10d has reached the predetermined reserve level, a signal light incorporated in an indicator (not shown) will flash on and continue to remain lighted thus indicating that the emergency supply of fuel in the main tank is being used.

After the fuel in the main tank has become completely exhausted, and the fuel level drops below the level of the outlet opening 109 bubbles of air will enter the emergency reservoir and break the atmospheric seal to permit the liquid in the emergency reservoir to flow from the outlet opening 109. Inasmuch as the subsequent operation of the apparatus from this point is identical in operation as that heretofore mentioned in connection with my prior described modifications, it need not be here repeated other than to say that as long as the supply of fuel in the emergency reservoir is being used an intermittent flashing of the signal lamp will occur together with a simultaneous oscillation of the pointer of the indicator. Dual signals of an unmistakable and a continuing character will thus be given the pilot during the period that the emergency reserve supply of fuel in the emergency reservoir is being used.

It is also worthy of note that in the modification of the invention illustrated in Figure 26, it becomes absolutely necessary to completely fill the emergency reservoir before the apparatus will operate to correctly indicate the fuel contents in the main tank.

A still further modification of the invention is illustrated in Figure 27. The construction of the main tank 10e is substantially identical in construction as that of the main tank 10d illustrated in Figure 26, in that it is provided at its lower end with a sump (not shown) in which the lower end (not shown) of the emergency reservoir B⁵ is positioned. As in the case of Figure 26, the upper wall 118 of the emergency reservoir B⁵ has connected thereto a bypass line 119 incorporating a check valve 120, the outlet end of which extends into a filler neck 121 incorporating a filler cap of the type set forth herein above in connection with Figures 2 to 5, inclusive. The operation of filling the tank 10e is the same as that set forth hereinabove in connection with Figure 26. The modification illustrated in Figure 27 can be distinguishable from the modification shown in Figure 26, in that a different type of fuel level indicating mechanism is used.

It will be observed that the bellows 45e is supported within the emergency reservoir B⁵ by a bracket member 122 and so arranged with respect thereto such that its lower open end is subjected to the suction pressure of the fixed column of fuel in the emergency reservoir.

The upper or closed end 123 of the bellows has suitably secured thereto in upright relationship the stem 124 of a plunger 125 adapted for slidable movement in the lower end of a tube 126 supported by the bracket member 122. The opposite or upper end of the tube 126 communicates remotely with a secondary bellows 127 which is appropriately sealed to the atmosphere. The numeral 128 indicates a suitable base or support for the bellows 127 which is provided with a scale 129 calibrated in suitable units of liquid measurements. A rod 130 carried in upright position upon the upper end of the bellows 127 is adapted for movement over the scale.

In operation, as the primary bellows 45e begins to collapse, being acted upon by the suction force of the column of liquid in the emergency reservoir B⁵, the plunger 125 is pulled downwardly, the effect of which is to create a proportional suction pressure against the inner upper surface of the secondary bellows 127 and consequently move the rod 130 downwardly over the graduations of the scale 129.

It will also be observed that an inner spring clip 131 is secured to and insulated from the upper inner wall of the secondary bellows 127. This spring clip is provided with oppositely disposed contact fingers 132 so positioned as to engage a pair of electrical contact points 133 carried by and insulated from the base 128 adjacent the lower open end of the bellows 127. These contacts 133 are adapted for electrical connection with a signal lamp (not shown) of the type hereinabove set forth in connection with Figure 1.

From the foregoing description it will be apparent that when the bellows 127 has been partially collapsed, the electrical circuit to the signal lamp will be closed and the light will flash on and indicate, as in the case of the other modifications, that the reserve supply of fuel in the main tank is being used.

In Figure 28, the principle of operation hereinabove set forth as to the other modifications of the invention is shown applied to an underground fuel supply tank 134.

In this modification of the invention the numeral 135 indicates an emergency reservoir similar in function to the emergency reservoirs heretofore described. A sump 136 is provided in the lower end of the tank 134 in which the lower end of the emergency reservoir is positioned. It will be further noted that the lower end of the emergency reservoir is provided with an outlet 137 including an upstanding portion 138 which discharges into the sump 136. The upper end of the emergency reservoir 135 is provided with a filler neck 139 and a filler cap 140 of the type heretofore described in Figures 2 to 5, inclusive.

In operation, fuel is poured into the main tank 134 through the emergency reservoir 135 and, when the main tank 134 is completely filled, the filler cap 140 is closed thus sealing the emergency reservoir to atmospheric pressure. A bellows 141 is mounted within the emergency reservoir to be acted upon by the suction force of the column of liquid therein resulting from the differential in head pressures between the fixed column of liquid in the emergency reservoir and the variable column of liquid in the main tank. This bellows is suitably connected to a liquid measuring device C⁶ similar in construction to that set forth hereinabove in connection with Figure 1 in that it not only visually indicates the quantity of fuel remaining in the main tank 134 but also signals (as by the flashing of a signal lamp) when the liquid in the main tank has reached a predetermined reserve level.

A conduit 142 adapted for connection to a fuel pump (not shown) extends downwardly into the main fuel tank 134. The lower end 143 of this conduit is provided with a foot valve 144 so constructed and arranged such that when the liquid in the main tank reaches the level of this valve, it will close and prevent the level of the fluid from dropping any lower. Inasmuch as the outlet opening 137 of the emergency reservoir is positioned below the top of the sump 136, a predetermined head of liquid will always remain in the main tank 134 and effectively seal the emergency reservoir to the atmosphere. In this manner fuel may be readily pumped into the tank 134 through the conduit 142 and in so doing a correct reading of liquid contents both in filling and in emptying the main tank will be obtained through the operation of the bellows 141 and resulting actuation of the liquid measuring device C⁶.

A somewhat different arrangement utilizing the same hydrostatic principles enumerated above in connection with the other modifications of the invention, is illustrated in Figures 29 and 30.

In Figure 29 an underground tank 145 is illustrated which is substantially identical in construction with the tank 134 of Figure 28. This tank also incorporates a conduit 146 provided with a foot valve 147 of the type illustrated in Figure 28. The tank 145 is further provided with a sump portion 148 into which the lower end of a vertical pipe 149 extends with its outlet opening 149' lying materially below the bottom wall 150 of the tank. The pipe 149 constitutes a part of a so-called "syphoning arrangement" and is in communication with a similarly arranged portion of a secondary pipe 152 which is positioned exteriorly of the tank 145 through the medium of a branch pipe 153 disposed above the tank. This branch pipe is provided with a filler neck 154 and a filler cap 155. The longitudinal axis of the lower end of the pipe 152 is disposed horizontally and in a plane below the level of the bottom of the tank 145. This pipe 152 communicates at its outer end with a bellows 156 similar in construction to the bellows set forth hereinabove in connection with the several other modifications of the invention. A liquid measuring device generally indicated by the letter C⁷ is operated by expansion of the bellows.

In operation it is essential that the pipes 149, 152 and 153 forming the so-called "syphon arrangement" be completely exhausted of air and filled with liquid when the main tank 145 has been filled with liquid. When the tank 145 is completely filled with liquid a static head of liquid pressure, indicated by the letter M, will be acting upon the bellows to expand it fully and give a full scale reading on the indicator of the liquid measuring device C⁷. It will also be apparent that a static head of liquid pressure indicated by the letter N in the pipe 149 will be exactly balanced by the static head of liquid in the main tank 145. As the level of the liquid in the main tank 145 drops a proportionate suction pressure will be built up in the pipe 149 which acts upon the static head of liquid trapped in the pipe 152 so that the pressure therein is reduced proportionately as the static head of liquid pressure in the main tank 145 decreases. Consequently the pressure on the bellows 156 will be proportionately decreased and the bellows will be collapsed and move the indicator element of the liquid measuring device C⁷ toward the zero setting. By providing a foot valve 147 in the conduit 146 a predetermined head of liquid will remain trapped in the main tank 145 so that once the syphon arrangement is charged with liquid, it will remain so charged and a correct indication of fluid contents in the main tank will be obtained both in filling and emptying the same.

Figure 30 is illustrative of the fact that the bellows 156 may be mounted in an inverted position and function equally as well as in the position indicated in Figure 29.

Figure 31 illustrates another modification of the invention wherein the tank 10f is provided with a filler neck 157 and filler cap 18f of the type set forth above in connection with Figure 1. Mounted internally of the tank 10f there is an emergency reservoir B⁸ which has an outlet opening 158 positioned adjacent the bottom wall 159 of the main tank. A pipe 160 provided with a check valve 161 is connected at its one end to the top of the emergency reservoir. This pipe extends into the filler neck 157 at its other end. The purpose of the check valve 161 is to permit the air in the emergency reservoir $B^8$ to escape into the atmosphere when filling the main tank so as to insure that the emergency reservoir will not only be completely filled with fluid but also that the air is completely exhausted therefrom. This check valve also operates to seal the liquid in the reservoir to the atmosphere in the event of opening the filler cap 18f and thereby trap the liquid in the emergency reservoir and prevent inadvertent gravity drainage into the main tank.

A bellows 45f is suitably mounted in the upper end of the emergency reservoir $B^8$ to be acted upon by the suction force of the normally fixed column of liquid in the emergency reservoir resulting from the differential in head pressure between the trapped liquid in the emergency resrvoir and the variable column of liquid in the main tank during operation of the apparatus. To properly position the bellows 45f in predetermined relation in the emergency reservoir a housing 162 is provided which is fixed at its upper end to the top of the emergency reservoir. A vertically extending rod 163 is secured intermediate its ends to the closed end of the bellows 45f. This rod passes downwardly through a guideway 164 formed in the lower end of the housing 162. The bottom wall 159 of the main tank 10f is formed with an exteriorly formed circular flanged opening 165 into which is tightly seated the upper open end of a cup-shaped glass receptacle 166. Suitable calibrations 167 are formed on the one side of the receptacle 166 with which cooperates an index 168 carried at the lower end of the rod 163 heretofore mentioned.

The housing 162 incorporates a pair of oppositely disposed spring contact strips 169 which are electrically connected with a signal lamp indicated by the numeral 170. The upper or free end of the rod 163 carries a contact strip 171 adapted for engaging the contact strips 169 upon downward movement of the bellows 45f.

As in the case of Figures 26 and 27 heretofore described, the check valve 161 of Figure 31 operates to not only permit the escape of air from the emergency reservoir during the initial filling of the main tank but it also serves the purpose of maintaining the trapped condition of the fuel in the emergency reservoir. It is also to be observed that the construction of the apparatus illustrated in Figure 31 operates substantially the same as the apparatus indicated in Figure 23; that is to say, in this modification of the invention, the float has been entirely eliminated and the magnitude of the suction force acting upon the bellows 45f is utilized to effect a collapse or expansion of the bellows during emptying and filling of the tank to obtain a correct indication of fuel contents in the main tank.

Consequently, when the reserve level of fuel in the main tank 10f has been reached the signal lamp 170 will flash on and remain lighted as long as the reserve supply of fuel in the main tank is being used.

When, however, the fuel in the main tank 10f has become completely exhausted, air will begin to enter the lower outlet 158 of the emergency reservoir $B^8$. At this instant an oscillation of the index 168 will be obtained together with an intermittent flashing of the signal lamp 170 indicating that the emergency reserve supply of fuel in the emergency reservoir is being used.

A still further modification of the invention is illustrated in Figure 32. In this modification of the invention the tank 10h is formed with a filler neck 183 which includes a filler cap 25h of the type hereinablve set forth in connection with Figures 3 to 5, inclusive, of the drawings. The bottom of the tank 10h is provided with a sump portion 185 into which the lower end of an emergency reservoir $B^{10}$ discharges. The upper end of the emergency reservoir $B^{10}$ is provided with a bypass line 186 which discharges at its outer end into the filler neck 183. This bypass line incorporates a check valve 187 of the type illustrated in Figure 26 of the drawings. This bypass line and check valve is provided for the purpose of permitting the escape of air in the emergency reservoir during the time that the main tank 10h is being filled with fluid. As in the case of Figure 26, the check valve 187 also serves the purpose of maintaining the sealed condition of the liquid in the emergency reservoir should the filler cap 25h be opened. A liquid measuring device $C^{10}$ embodying a bellows 45h is also included in this modification of the invention. As shown in this figure, the upper or closed end of the bellows 45h has secured thereto a vertically extending rod 188 which is connected at its upper end to the wiper element of the liquid measuring device $C^{10}$. The lower end of the rod 188 has pivotally attached thereto a so-called "bell jar" indicated by the numeral 190 which is provided at its lower extremity with an outlet opening 191.

When filling the main tank 10h the liquid will rise in the emergency reservoir and carry with it the bell jar 190 and move it into the dotted line position indicated in Figure 32. A stop (not shown) may be incorporated in the bell jar to limit its upward pivotal movement to the horizontal dotted position indicated in Figure 32. As the level of the liquid in the emergency reservoir continues to rise the liquid will enter the outlet opening 191 and completely fill the bell jar. Obviously the weight of this liquid will force the bell jar downwardly moving it into the indicated full line position. In the modification illustrated in Figure 32 the elements incorporated in the liquid measuring device $C^{10}$ are so arranged such that when the emergency reservoir is completely filled with liquid a full scale reading will be obtained. When the main tank and emergency reservoir are completely filled with liquid and with the emergency reservoir sealed to the atmosphere, a correct indication of liquid contents in the main tank 10h will be obtained which will be proportional to the drop in level of the liquid in the main tank. It will be apparent from the foregoing, that when the liquid in the main tank has reached the reserve level that a flashing of the signal lamp (not shown) will occur in the same manner heretofore described which continues during the time that the reserve supply of fuel is being used.

As is the case in the other modifications of the invention hereinabove described, when the level of the liquid in the main tank 10h drops below the level of the outlet opening 185 bubbles of air will enter the emergency reservoir and liberate predetermined quantities of the fuel in the emergency reservoir. The operation of the emergency reservoir during the time that the supply of fuel therein is being used is substantially the same as it is in the case of the several other modifications of the invention hereinabove descrlbd; that is to say that during this time an intermittent flashing of the signal lamp together with an oscillation of the pointer of the indicator will occur thus indicating that the supply of fuel in the emergency reservoir is being used. It is also important to note that as long as the bell jar is completely submerged in the liquid in the emergency reservoir, the weight of the liquid in the bell jar is zero, consequently, the suction force of the column of liquid in the emergency reservoir is the only force acting upon the bellows tending to collapse it. As the level of the liquid in the emergency reservoir drops below the top of the bell jar, it will become apparent that a steadily increasing portion of the bell jar is becoming exposed to the atmosphere. The fluid trapped in the exposed portion of the bell jar will therefore act as a weight tending to prevent the bellows from returning to normal position as the suction pressure acting upon the bellows decreases. When the level of the liquid in the emergency reservoir reaches the level of the outlet opening 191 of the bell jar the liquid which has heretofore been trapped in the bell jar, will be released and complete drainage of the fluid in the bell jar having been effected, the bellows 45h together with the liquid measuring device $C^{10}$ will return to a zero position.

From the foregoing discussion it will be apparent that the use of a bell jar serves the purpose of providing a positive weight which acts upon the bellows and tends to prevent it from gradually expanding as the liquid in the emergency reservoir is being used so that the character of the signals emitted during the consumption of the fuel in the emergency reservoir will be positively insured.

A further modification of the invention is illustrated in Figure 33. This embodiment of the invention includes a main tank 10k provided at its lower end with a sump portion 194 and at its upper end with a filler neck 192 and a filler cap 193 of a conventional design. The upper open end of a bellows 45k is fixedly secured to the top wall of the main tank 10k. An upright stem 199 is secured at its lower end to the lower or closed end of the bellows 45k. At its upper end the stem 199 is connected to the wiper element of a liquid measuring device $C^{12}$ of the type set forth hereinabove in connection with Figure 1. The upper wall of the main tank 10k is also formed with a suitable guideway 200 within which a float 53k of the type set forth hereinabove in connection with Figure 1 is adapted for vertical sliding movement. At its upper end, the float 53k is fixedly secured to the lower or closed end of the bellows 45k. The lower end of the float 53k is formed with a hollowed chamber identified by the letter $B^{12}$ which combines both the function of an emergency reservoir as well as the function of the bell jar illustrated in Figure 32. As shown in Figure 33 the lower end of chamber $B^{12}$ is provided with an outlet opening 195 which drains directly into the sump portion 194 heretofore mentioned. The upper end of the bell jar $B^{12}$ is provided with a conduit 196 which extends upwardly through the float 53k, and has incorporated in its upper end a check valve identified by the numeral 197. A vent 198 formed in the side wall of the guideway 200 forms a communicating passageway between the check valve and the atmosphere through the filler cap 193 mentioned above.

In operation as the main tank is filled with liquid the liquid will gradually rise in the emergency reservoir $B^{12}$ through the outlet opening 195. It is obvious that at this time the air which may be confined in the bell jar is permitted to escape to the atmosphere through the check valve 197 and vent 198. It will also be observed that as the liquid rises in the main tank, the float 53k will be displaced upwardly, thereby collapsing the bellows 45k and effect a movement of the wiper element in the liquid measuring device $C^{12}$ to indicate the fluid contents in the main tank during the filling operation.

During fuel consumption and at a time when the liquid in the main tank has reached the reserve level, the bellows 45k in gradually expanding will move the wiper element of the liquid measuring device downwardly to not only indicate the quantity of fuel remaining in the main tank but to close the circuit to a signal lamp (not shown) thus indicating that the reserve supply of fuel in the tank is being used. After the fuel has been completely exhausted in the main tank 10k and the fuel in the sump portion 194 is being used, the liquid in the emergency reservoir above the level of the liquid in the sump portion acts as a weight to suppress upward movement of the bellows. Thus a positive force, for example, the weight of the confined fluid in the bell jar $B^{12}$, acts to hold the bellows 45k in its displaced downward position and at the same time keep the wiper element of the liquid measuring device close to or adjacent the zero setting of the scale.

When the supply of fuel in the sump portion has been completely exhausted bubbles of air will enter through the outlet opening 195 thus releasing in successive stages, the fuel which is trapped in the emergency reservoir $B^{12}$. At this time as in the case of Figure 1, dual signals of different character will be obtained through operation of the liquid measuring device, that is to say, a rapid oscillation of the pointer of the indicator will be effected together with an intermittent flashing of the signal lamp.

A modified form of the invention illustrated in Figures 32 and 33 is illustrated in Figure 34. In this modification of the invention the main tank 10m is provided at its lower end with a sump portion 201 and at its upper end with a filler neck 202 and a filler cap 203. As in the case of Figure 34, the upper open end of the bellows 45m is fixedly secured to the top wall of the tank 10m. The lower or closed end of the bellows 45m has rigidly connected thereto in upright position a stem 207, the upper end of which is connected to the wiper element of a liquid measuring device $C^{13}$. As in the case of Figure 33, the upper end of the tank is provided with a guideway 206 within which is slidably mounted the upper end of a float 53m. This float, as in the case of the float of Figure 33, is rigidly secured to the lower or closed end of the bellows 45m. The lower end of the float 53m has pivotally attached thereto, as indicated by the numeral 205, the upper end of a bell jar $B^{13}$ which is provided at its lower end with a discharge outlet 204.

The distinguishing feature of the modification shown in Figure 34 resides in the fact that the bell jar $B^{13}$ is pivotally supported on the float 53m. Thus when the level of the liquid in the main tank 10m rises, the bell jar $B^{13}$ will initially be moved into its dotted line position. During this time the float will be gradually collapsing the bellows so that an indication of fluid contents in the main tank 10m will be obtained.

When the liquid rises above the outlet opening 204, with the bell jar in its dotted position, liquid will enter and completely fill the bell jar and it will be moved automatically by gravity action into the full line position indicated in Figure 34.

Without going into any great detail, suffice it to say that the apparatus as a whole operates in a manner identical with the operation of the modification illustrated and described hereinabove in connection with Figure 33. It is also to be noted, in connection with this modification of the invention, that when the level of the liquid in the sump portion 201 reaches the level of the outlet opening 204 in the bell jar B¹³, the liquid which heretofore has been trapped in the bell jar will be gradually drained therefrom in successive stages. As in the case of Figure 32 as the weight of the liquid trapped in the bell jar gradually decreases the force tending to hold the bellows 45m in its expanded position will reduce in magnitude and thus permit the bell jar to gradually assume its normal position. It is also to be noted that, during the time the liquid is being consumed in the bell jar, dual signals, unmistakably different in character, will be obtained, namely, an oscillation of the pointer of the indicator together with a simultaneous intermittent flashing of the signal lamp.

It is also important to point out at this time that the bell jars illustrated in Figures 32 to 34 are self filling, thus eliminating the necessity of removing the bell jar from the apparatus when each cycle of operation is completed. It is also important to emphasize the fact that in Figures 32 to 34, inclusive, the use of a bell jar of the type described provides means for positively weighting the bellows during the time that the emergency reserve supply of fuel is being used to thus insure that the dual signals hereinabove set forth will be obtained.

The preferred form of constructing the indicator 67 hereinabove set forth in connection with the several described modifications of the invention is particularly illustrated in Figures 8 and 9 of the drawings.

As shown in these figures this indicator comprises generally a housing 225 which is provided with radially disposed ears 226 each having an opening 227 therein so as to permit of the indicator being mounted upon the instrument board of an aircraft. The housing 225, which may be of cast construction, is provided at its upper end with a lateral bore 228 within which is slidably disposed the outer casing 229 of a signal lamp 87. The forward open end of the container 229 is provided with a red glass bezel 230a through which rays of light from the signal lamp, when illuminated, are readily visible. An electrically operated liquid measuring device 230 incorporating a pointer 231 capable of angular movement over a scale 232 is suitably mounted within the forward open end of the housing 225. An annular opening 233 is formed in the forward open end of the housing within which a circular glass bezel 234 is adapted to be seated. An annular groove 235 is formed in the annular opening 233 which is for the purpose of receiving a locking wire 236 for the glass bezel.

An emergency switch is incorporated in the indicator to check the condition of the signal lamp 87. This switch comprises a rod 237 provided at its forward end with a button 238. At its rearward end the rod 237 is connected to a spring strip 239 which is electrically connected at its lower end to the main current carrying binding post 240.

The strip 239 is provided at its upper end with a contact 240a which is normally spaced from a secondary contact 241. This last mentioned contact is intended to be electrically connected to the one terminal of the signal lamp 87, the other terminal of this signal lamp being suitably grounded through the housing 225. From the foregoing description it will be apparent that when the rod 237 is pushed inwardly, contact will be effected between the primary and secondary contacts 240a and 241, respectively, thus closing the circuit to the signal lamp 87.

By arranging the signal lamp and the gauge adjacent one another in the manner indicated in Figure 8, it will be apparent that the dual signals emitted by the gauge and the signal lamp may be readily observed by the pilot without materially detracting from his operation of the aircraft.

While my broad idea is particularly applicable to a liquid storage apparatus as used on aircraft, I wish it to be understood that my invention is not limited solely for use in connection with such apparatus inasmuch as the basic principle consists in operating an indicating or recording device by means of a controlling column of liquid interposed between said device and a body of liquid in such a manner that the weight of the controlling column of liquid acting upon a governing element (the bellows) of said device causes said governing element to move in one direction or the other automatically as the level of said body of liquid varies and thus causes said indicating device to indicate either the level of the body of liquid or the quantity of the same. By using a controlling column of liquid in the manner described, to operate the indicating device I obtain a more accurate reading than is possible with an apparatus in which air, gas or other compressible fluid is arranged between the indicating device and measurable body of liquid, and by equipping the apparatus with an indicating device whose governing element, for example, the bellows, is open to the atmosphere, I overcome the liability of obtaining a false reading due to atmospheric changes. In other words, in my apparatus, the measurable liquid in the main supply tank and the governing element of the indicator are both under atmospheric pressure at all times and consequently any atmospheric changes that would result in a variation in the pressure on the liquid in the main tank would have a similar effect on the governing element of the indicator. Furthermore, as the controlling column of liquid is in direct communication with the supply of liquid in the main tank, any normal expansion or contraction of the liquid column will have no effect on the commercial accuracy of the apparatus.

Having thus described my invention what I claim, and desire to secure by Letters Patent is:

1. In combination, a main container for a variable column of liquid, an auxiliary container, a main fluid outlet in one of said containers, means for confining a continuous column of liquid in said auxiliary container, means operatively connecting said main container to said auxiliary container to permit uninterrupted flow of all the fluid from said main container through said outlet but prevent any flow of the confined liquid from said auxiliary container through said outlet until a predetermined differential in the heads of liquids in both containers is obtained, and means for continuously measuring head differences between the liquids in said containers.

2. In combination, a main container for a variable column of liquid, an auxiliary container, a main fluid outlet in one of said containers, means for confining a continuous column of liquid in said auxiliary container, means operatively connecting said main container to said auxiliary container to permit uninterrupted flow of all the fluid from said main container through said outlet but prevent any flow of the confined liquid from said auxiliary container through said outlet until a predetermined differential in the heads of liquids in both containers is obtained, means for continuously measuring head differences between the liquids in said containers, and signaling means controlled by said last-mentioned means for signaling when a predetermined head difference between said liquids is obtained.

3. In combination, a main container for a variable body of liquid, an auxiliary container in in operative communication with said main container, means for confining a continuous column of liquid in said auxiliary container, and means including a governing element that is capable of moving in opposite directions and controlled by the column of liquid in said auxiliary container for continuously measuring head differences between the liquids in said containers and for automatically indicating when a predetermined head difference between said liquids is obtained.

4. In combination, a main container for a variable column of liquid, an auxiliary container provided with a fuel inlet, a main fuel outlet in one of said containers, means cooperating with the fuel inlet in said auxiliary container for confining a continuous column of liquid therein, means operatively connecting said main container to said auxiliary container to permit uninterrupted flow of all the liquid from said main container through said fluid outlet but prevent any flow of the confined liquid from said auxiliary container through said outlet until a predetermined differential in the heads of liquids in both containers is obtained, and measuring means cooperating with both containers for continuously measuring the difference between the variable and continuous column of liquid in said containers and for indicating said differences.

5. In combination, a main fuel container for a variable column of liquid, an auxiliary container in operative communication with said main container, means associated with said auxiliary container for confining a continuous column of liquid therein, and means controlled by said continuous column of liquid for indicating the head or quantity of the variable column of liquid comprising an indicating device provided with a pressure responsive governing element that is capable of moving in opposite directions, whereby the weight of the effective length of said confined column of liquid acting upon said governing element acts to determine the position of said governing element and cause said indicating means to continuously indicate the quantity or depth of the variable column of liquid.

6. In combination, a main fuel container for a variable column of liquid, an auxiliary container in operative communication with said main container, means associated with said auxiliary container for confining a continuous column of liquid therein, and means controlled by said confined column of liquid for measuring the head or quantity of the variable column of liquid comprising an indicating device provided with a pressure responsive governing element that is capable of moving in opposite directions, so that the weight of the effective length of said confined column of liquid exerted on said governing element will cause it to move in one direction or the other in accordance with the rise and fall in the level of said variable column of liquid.

7. In combination, a main fuel container for a variable column of liquid, an auxiliary container in operative communication with said main container, means associated with said auxiliary container for confining a continuous column of liquid therein, means controlled by said confined column of liquid for measuring the head or quantity of the variable column of liquid comprising an indicating device provided with a pressure responsive governing element that is capable of moving in opposite directions, so that the weight of the effective length of said confined column of liquid exerted on said governing element will cause it to move in one direction or the other in accordance with the rise and fall in the level of said variable column of liquid, and further means associated with said containers for periodically introducing air into said auxiliary container to intermittently release the confined column of liquid only when the variable column of liquid in said main container falls below a predetermined level.

8. In combination, a main container for a variable column of liquid, an auxiliary container in operative communication with said main container including means for confining a continuous column of liquid herein, measuring means controlled by the confined column of liquid for continuously measuring the head difference between the variable and continuous column of liquid and for indicating said difference, and further means interposed between said containers for periodically introducing air into said auxiliary container and intermittently release the confined column of liquid only when the variable column of liquid in the main container falls below a predetermined level.

9. In combination, a main container for a variable column of liquid, an auxiliary container in operative communication with said main container including means for normally confining a continuous column of liquid therein, measuring means controlled by the confined column of liquid for continuously measuring the head difference between the variable and continuous column of liquid and for indicating said difference, and a fluid trap arrangement interposed between said containers for periodically introducing air into said auxiliary container and momentarily and intermittently release the confined column of liquid only when the variable column of liquid falls below a predetermined level.

10. In combination, a main fuel container for a variable column of liquid, an auxiliary container in operative communication with said main container including means for normally confining a continuous column of liquid therein, measuring means controlled by the confined column of liquid for continuously measuring instantaneous head differences between the variable and continuous column of liquid and for indicating such differences, a fluid trap arrangement interposed between said containers operating to periodically introduce air into said auxiliary container and intermittently momentarily release the confined column of liquid only when the variable column of liquid in the main container falls below a predetermined level, and visual means for indicating said liquid release.

11. In combination, a main container for a variable column of liquid, an auxiliary container in operative communication with said main container, means for indicating the head or quantity of the variable column of liquid in said main container comprising indicating means provided with a pressure responsive governing element that is capable of moving in opposite directions, means for normally confining a continuous column of liquid between the variable column of liquid in said main container and the governing element of said indicating means, so that the weight of the effective length of said confined column of liquid exerted on said governing element will cause it to move in one direction or the other in accordance with the rise and fall in the level of said variable column of liquid, a fluid trap arrangement interposed between said containers operating to periodically introduce air into said auxiliary containers and momentarily release the confined column of liquid only when the variable column of liquid falls below a predetermined level, and visual means controlled by movement of said governing element for indicating said liquid release.

12. In combination, a main container for a variable column of liquid, an auxiliary container in operative communication with said main container, means for indicating the head or quantity of the variable column of liquid comprising an indicating device provided with a governing element that is capable of moving in opposite directions, means for normally confining a continuous column of liquid between the variable column of liquid and the governing element of said indicating device, a fluid trap arrangement interposed between said containers operating to periodically introduce air into said auxiliary container and momentarily release the confined column of liquid when the variable column of liquid falls below a predetermined level and signalling means operatively connected to said governing element for emitting a signal of one character when a predetermined differential in the column of the liquids in said container is obtained and for automatically emitting a signal of a different character during the periodic admission of air into said auxiliary container.

13. In combination, a main container for a variable column of liquid, an auxiliary container in operative communication with said main container, means for visually indicating the head or quantity of the variable column of liquid comprising an indicating device provided with pressure responsive governing element that is capable of moving in opposite directions, means for confining a continuous column of liquid between the variable column of liquid and the governing element of said indicating device, and signalling means controlled by the downward movement of said governing element for emitting a signal of a distinct character when a predetermined differential between the continuous and variable columns of liquid is obtained.

14. In combination, a main container for a variable column of liquid, an auxiliary container in operative communication with said main container, means for continuously visually indicating the instantaneous heads or quantity of the variable column of liquid comprising an indicating device including a pointer and a governing element that is capable of moving in opposite directions, means for normally confining a continuous column of liquid between the variable column of liquid and the governing element of said indicating device, a fluid trap arrangement interposed between said containers operating to periodically introduce air into said auxiliary container and momentarily release the confined liquid, said momentary release of liquid operating to effect an oscillation of the pointer of said indicating device and thereby signal said liquid release.

15. In combination, a main container for a variable column of liquid, an auxiliary container, a fluid trap interposed between said containers, float actuated means associated with one of said containers for continuously indicating the head or quantity of the variable column of liquid and for automatically signaling when said liquid falls below a predetermined level and sealing means for normally confining a continuous column of liquid within said auxiliary container, said fluid trap operating to subject the confined column of liquid to atmospheric pressure when the liquid level of the variable column falls below the inlet of said liquid trap and momentarily release predetermined quantities of said confined liquid into said main container.

16. In combination, a main container for a variable column of liquid, an auxiliary container, a liquid trap interposed between said containers, float actuated means associated with one of said containers for continuously indicating the head or quantity of the variable column of liquid and for automatically emitting a signal of one character when said liquid falls below a predetermined level, and sealing means for normally confining a continuous column of liquid within said auxiliary container, said fluid trap operating to subject the confined column of liquid to atmospheric pressure when the liquid level of the variable column of liquid falls below the inlet of said liquid trap and momentarily release predetermined quantities of said confined liquid into said main container, whereby said signaling means is caused to emit a signal of a different character and indicate the release of said confined column of liquid.

17. In combination, a main container for a variable column of liquid, an auxiliary container in operative communication with said main container, means in said auxiliary container for indicating the head or quantity of the variable column of liquid comprising an indicating device provided with a governing element, a float for positively moving said governing element upwardly with a rise in level of said variable column of liquid, and means for confining a continuous column of liquid between said variable column of liquid and said governing element whereby the weight of the effective length of said confined column of liquid will move said governing element downwardly within said confined column with a fall in level of said variable column of liquid.

DAVID SAMIRAN.